United States Patent
Larsen

(10) Patent No.: US 9,547,838 B2
(45) Date of Patent: Jan. 17, 2017

(54) AUTOMATED GENERATION OF A THREE-DIMENSIONAL SPACE REPRESENTATION AND PLANOGRAM VERIFICATION

(71) Applicant: Oracle International Corporaton, Redwood Shores, CA (US)

(72) Inventor: Brett J. Larsen, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 301 days.

(21) Appl. No.: 14/073,231

(22) Filed: Nov. 6, 2013

(65) Prior Publication Data

US 2015/0123973 A1    May 7, 2015

(51) Int. Cl.
*G06T 15/08* (2011.01)
*G06Q 10/08* (2012.01)
(Continued)

(52) U.S. Cl.
CPC ............ *G06Q 10/087* (2013.01); *G06T 15/04* (2013.01); *G06T 17/20* (2013.01)

(58) Field of Classification Search
CPC ................ H04B 5/232; H04B 5/23206; H04B 21/21805; H04B 21/6125; H04B 21/6131; H04B 5/222; H04B 5/225; H04B 7/181; H04B 7/185; G08B 13/1966; G08B 13/19689; A63B 2220/806; A63B 2225/20; A63B 2225/50
See application file for complete search history.

(56) References Cited

U.S. PATENT DOCUMENTS

| 8,009,864 B2 | 8/2011 | Linaker et al. ............... 382/103 |
| 8,189,855 B2 | 5/2012 | Opalach et al. .............. 382/100 |

(Continued)

FOREIGN PATENT DOCUMENTS

| EP | 2 381 421 A2 | 10/2011 | ............. G06T 17/00 |
| FR | WO 2012/131181 A1 | 10/2012 | ............. G06Q 10/00 |

(Continued)

OTHER PUBLICATIONS

Mathecsys, "Visual Shelf Monitoring," http://mathecsys.com/visual-shelf-monitoring/ ; retrieved from the Internet Oct. 28, 2013, pp. 1-6.

*Primary Examiner* — Sultana M Zalalee

(57) ABSTRACT

The present disclosure provides an automated scheme for generating and verifying a three-dimensional (3D) representation of a target space. In one embodiment, the automatic generation of a 3D representation of a target space includes receiving target space data from one or more mobile data capture devices and generating a local point cloud from the target space data. In one embodiment, the local point cloud is incorporated into a master point cloud. In one embodiment, a polygon mesh is generated using the master point cloud and the polygon mesh is rendered, using a plurality of visual images captured from the target space, which generates the 3D representation. In one embodiment, the automatic verification includes comparing a portion of the 3D representation with a portion of an approved layout, and identifying one or more discrepancies between the portion of the 3D representation and the portion of the approved layout.

18 Claims, 13 Drawing Sheets

(51) Int. Cl.
*G06T 15/04* (2011.01)
*G06T 17/20* (2006.01)

(56) References Cited

U.S. PATENT DOCUMENTS

| | | | | |
|---|---|---|---|---|
| 2006/0221072 A1* | 10/2006 | Se | G01C 11/06 | 345/420 |
| 2007/0172101 A1* | 7/2007 | Kriveshko | A61B 5/4547 | 382/128 |
| 2008/0112610 A1* | 5/2008 | Israelsen | G06T 17/00 | 382/154 |
| 2009/0063306 A1 | 3/2009 | Fano et al. | | 705/28 |
| 2009/0063307 A1 | 3/2009 | Groenovelt et al. | | 705/28 |
| 2010/0267372 A1* | 10/2010 | Frost | A63H 30/04 | 455/414.1 |
| 2012/0194516 A1* | 8/2012 | Newcombe | G06T 17/00 | 345/420 |
| 2013/0300729 A1* | 11/2013 | Grimaud | G06T 7/001 | 345/419 |

FOREIGN PATENT DOCUMENTS

| | | | | |
|---|---|---|---|---|
| FR | WO2012/131181 A1 | 10/2012 | | |
| WO | WO2011/101800 A1 | 8/2011 | | G06K 9/78 |

\* cited by examiner

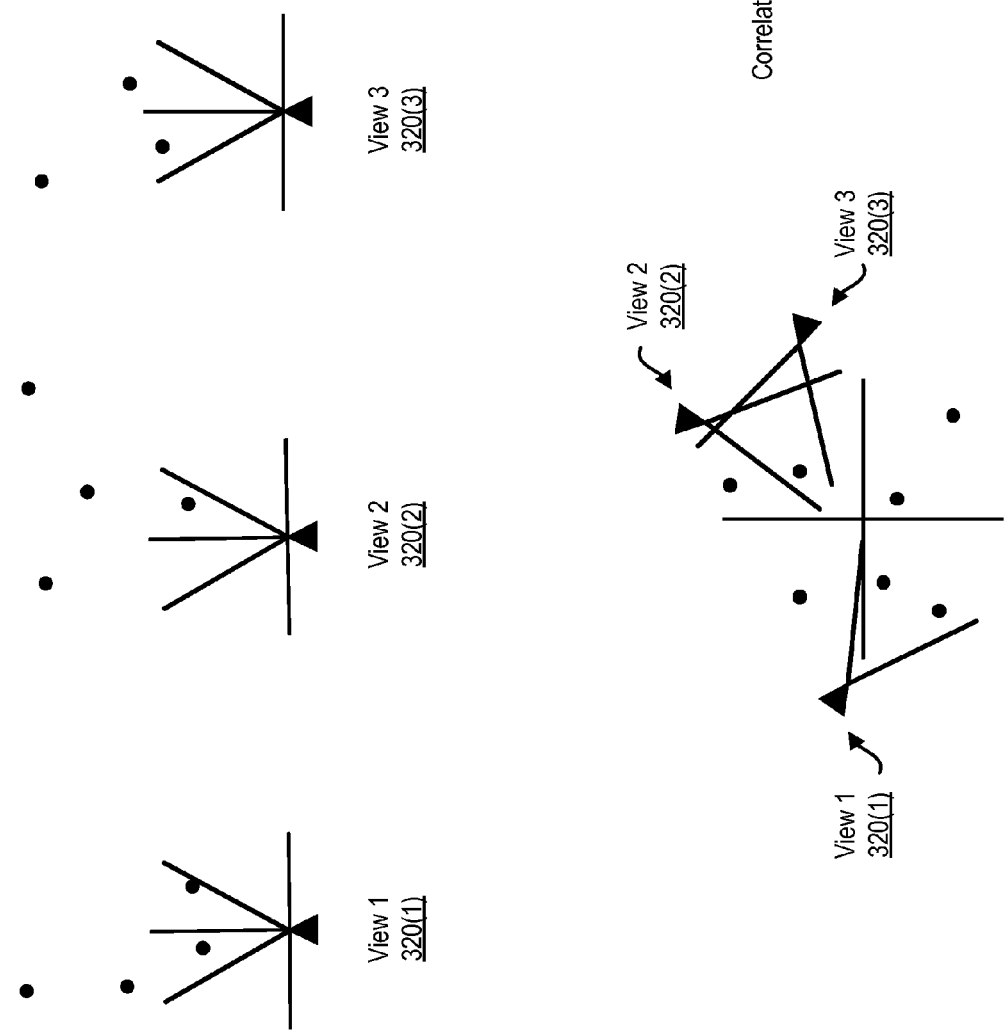

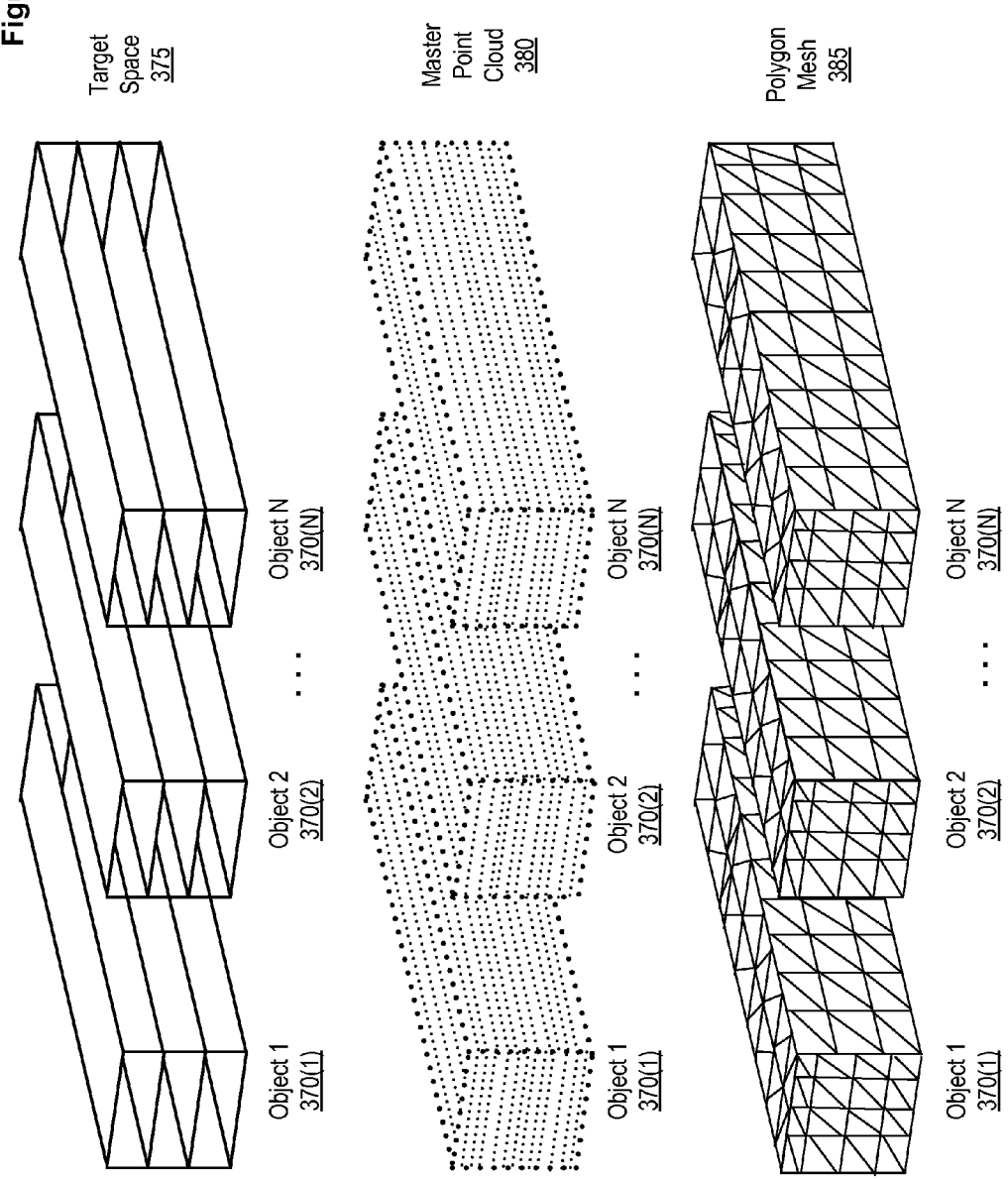

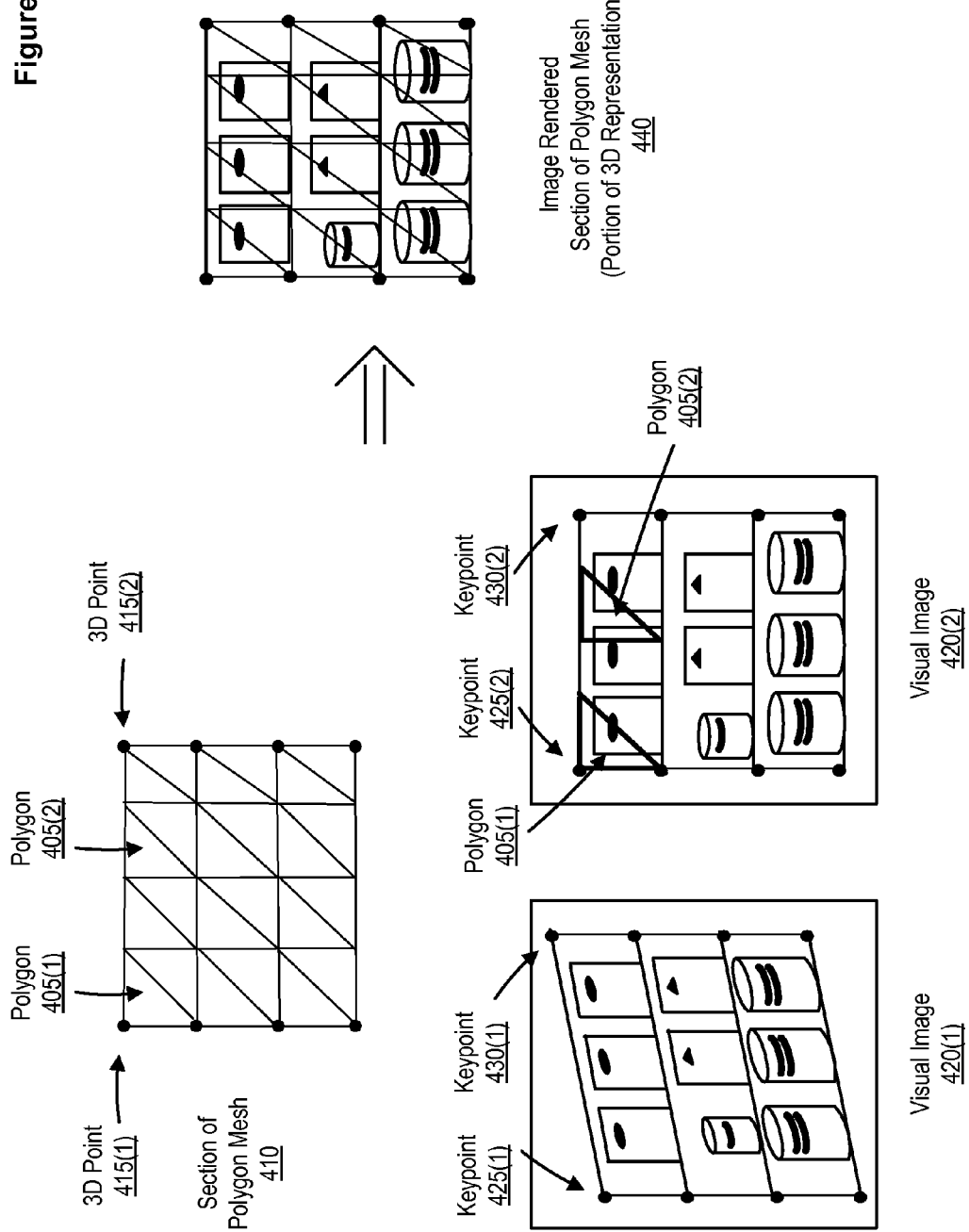

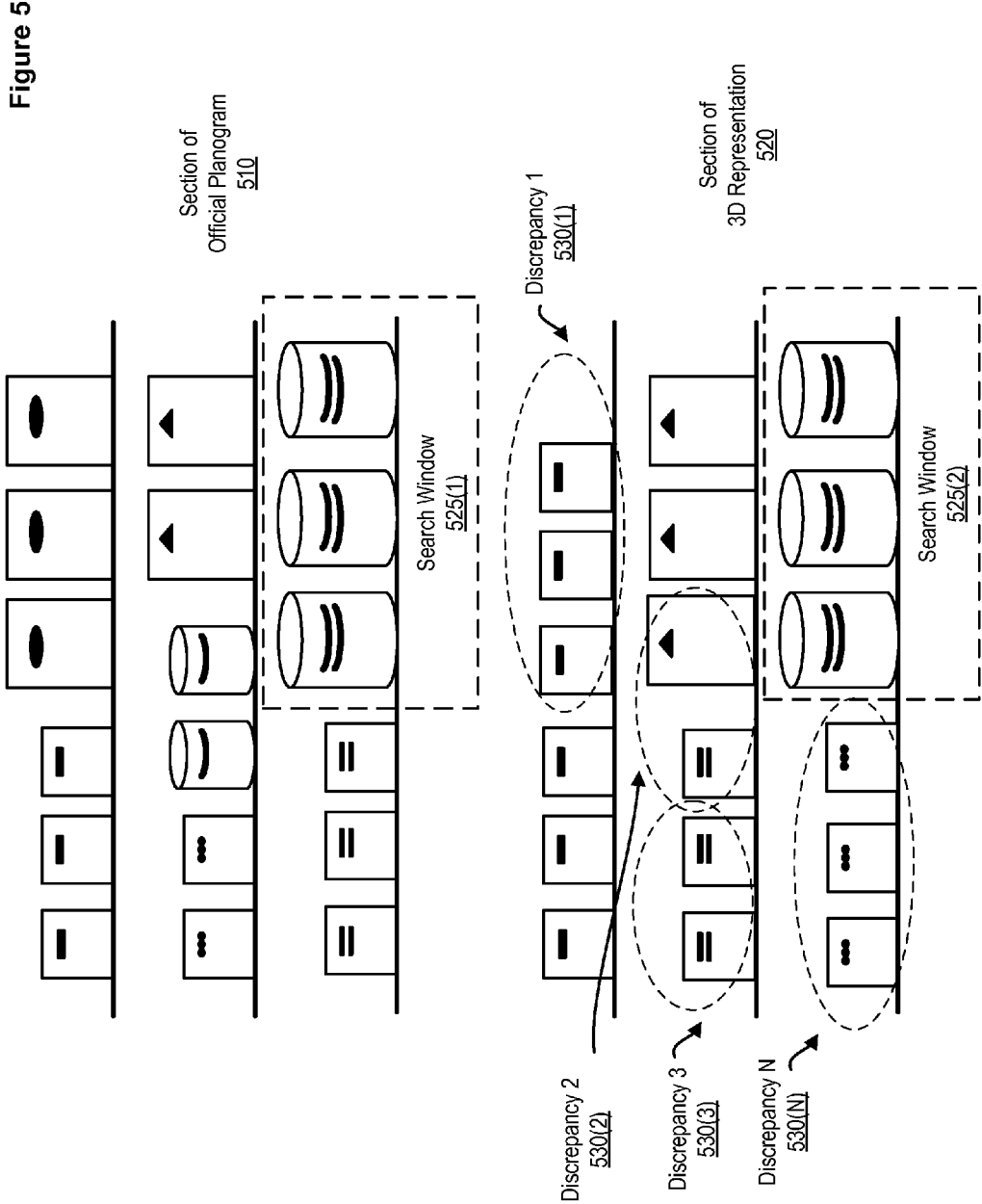

AUTOMATED GENERATION OF A THREE-DIMENSIONAL SPACE REPRESENTATION AND PLANOGRAM VERIFICATION

FIELD OF THE INVENTION

The present invention relates to planograms, and more particularly, to automated generation of a three dimensional (3D) representation of a target space and automated verification of the 3D representation using an official planogram.

BACKGROUND OF THE INVENTION

In today's competitive retail market, retail stores often rely on product placement to maximize product sales. For example, marketing analytics may indicate that a product's sales should increase when that product is placed next to another product (e.g., sales of peanut butter and jelly increase when placed next to bread), or a retail store and a product manufacturer may agree to have a particular product temporarily displayed in a special display case in order to attract customer attention and increase product sales. A central administrative office of a retail store often invests a great deal of resources (e.g., time, money) into developing product placement in the form of a planogram, which is implemented in one or more retail stores. However, product placement in a retail store may not accurately follow the planogram, which may result in missed product sales opportunities.

BRIEF DESCRIPTION OF THE DRAWINGS

The present invention may be better understood, and its numerous objects, features and advantages made apparent to those skilled in the art by referencing the accompanying drawings.

FIGS. 3A, 3B, 3C, and 3D are simplified block diagrams illustrating transformation of visual images of an example target space into an example point cloud and an example polygon mesh, according to one embodiment.

FIG. 4 is a simplified block diagram illustrating transformation of an example polygon mesh into an example 3D representation, according to one embodiment.

FIG. 5 is a simplified block diagram illustrating example discrepancies detected between an example official planogram and an example 3D representation, according to one embodiment.

Figure 1:
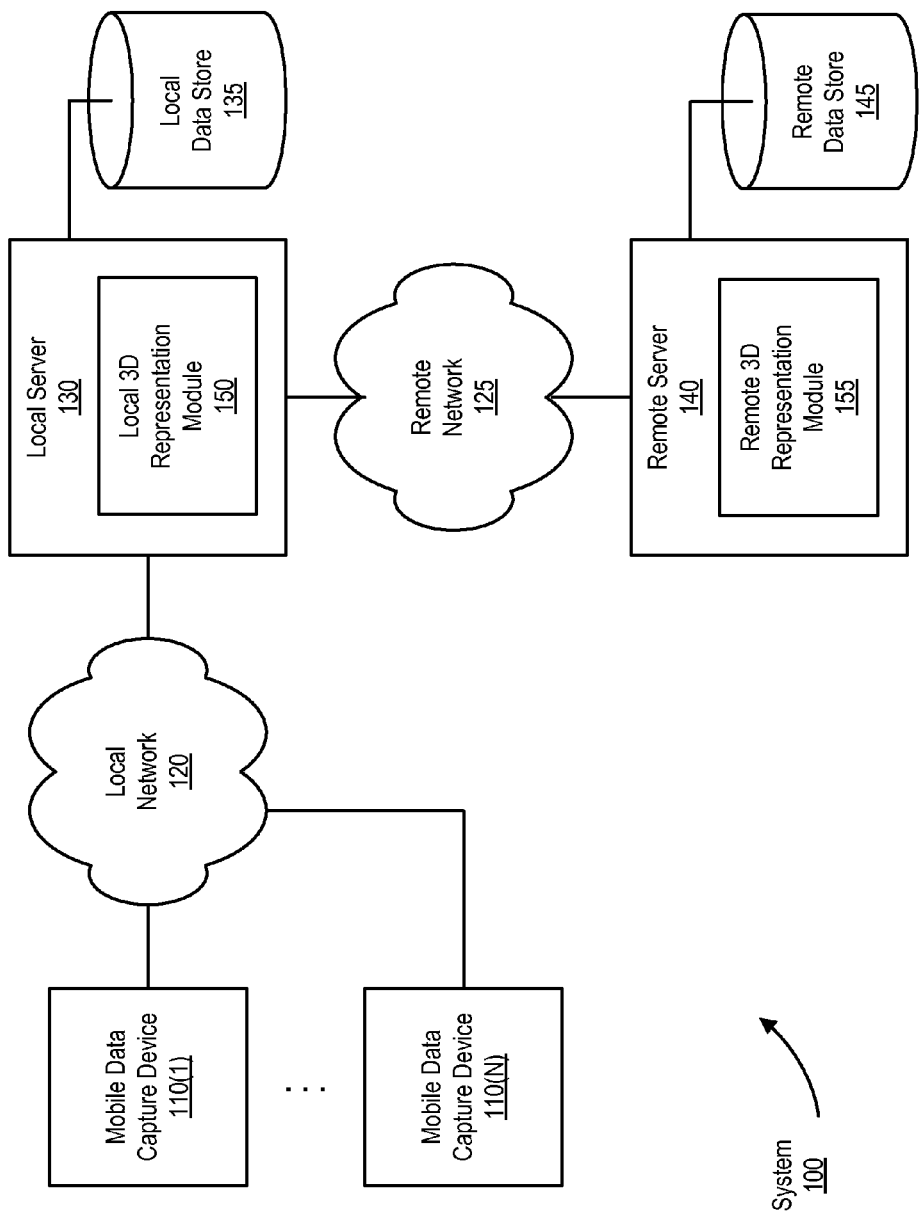
FIG. 1 is a simplified block diagram illustrating components of an example system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

Overview

Retail stores often use official planograms to arrange the layout or placement of objects in a retail store space, where the objects include shelving units, display cases, freezer cases, product bins, demonstration tables, products for sale, and the like. An official planogram is a visual diagram or other representation that illustrates an approved layout, or placement of objects, to which objects in the target space (e.g., a retail store space) should conform. An official planogram is often generated by a central office of a retail store chain for its retail stores to use. The approved layout can be quite detailed, often indicating specific locations of where particular objects are placed in the target space (such as a shelving unit placed in a particular location in the target space), the height and other descriptors of the particular objects (such as the height and number of individual shelves in each shelving unit), and the placement of smaller objects on various larger objects (such as placement of a product on a particular shelf).

Individual retail stores generally implement the official planogram by placing objects (e.g., shelving, display cases, products, and the like) in the retail store space according to the official planogram. For various reasons (e.g., due to the complexity of an official planogram, human error by staff members of the retail store, or customer mishandling of products), the object placement actually implemented in a retail store (also referred to as "real world" object placement) often differs from the official planogram. Typically, in order to verify that the retail store has accurately implemented the official planogram (e.g., confirm that the real world object placement conforms to the official planogram), a staff member performs manual visual verification of the real world object placement using the official planogram. Manual visual verification is time-consuming and tedious, which in turn increases the possibility of (human) error in the real world object placement (e.g., missing or misplaced products that are not detected and continue to differ from the official planogram).

Another verification scheme involves taking a photograph of the face of a particular shelf sub-section in the retail store (e.g., a head-on photograph) and directly comparing the photograph with a portion of a two-dimensional planogram that illustrates which products should be present on the shelf sub-section. Such a verification scheme requires that the photographs of the shelf sub-section must consistently conform to the shelf sub-section illustrated by the portion of the two-dimensional planogram. If the photograph does not closely conform to the portion of the two-dimensional planogram (e.g., only captures half of the shelf sub-section and half of another sub-section), products not visible in the photograph may erroneously be identified as missing or misplaced. Such consistency is obtained by a stationary camera that is aimed at the same shelf sub-section, or a semi-stationary camera with limited mobility that can change its aim to two or three shelf sub-sections. However, installation of a number of stationary or semi-stationary cameras to photograph a large number of shelf sub-sections is expensive, makes reconfiguration of the retail space much more difficult, and is difficult to scale to larger retail store spaces.

The present disclosure provides an automated scheme (e.g., requires little to no human intervention) for generating a three-dimensional representation of a target space (also referred to as a three-dimensional space representation) and verifying the three-dimensional representation using an official planogram. One or more mobile data capture devices travel throughout a target space (such as a retail store space or other space) and capture data from the target space. In one embodiment, the mobile data capture devices take a number of visual images of a portion of the target space using a camera. In another embodiment, the mobile data capture devices also take a number of corresponding depth maps of the portion of target space using a 3D sensor. The data captured from the target space (e.g., visual image data and/or depth map data) is used to generate a local three-dimensional (3D) point cloud that represents physical features of the objects located within the portion of target space, where the local generated 3D point cloud represents a portion of the target space that is located locally to the mobile data capture device that captured the data used to generate the 3D point cloud. Each local 3D point cloud is merged into a master 3D point cloud that represents the entire target space. Once complete, the master 3D point cloud in turn is used to generate a polygon mesh that represents an approximate surface of the 3D point cloud. The visual images of the target space are then used to paint the polygon mesh, thereby generating a three-dimensional model or representation of the target space (also referred to as a 3D representation). The 3D representation is compared to the official planogram to verify whether the real world layout of the 3D representation complies with the approved layout of the official planogram. Any discrepancies are identified and reported for correction to management of the target space.

By reducing human intervention, the automated scheme reduces image noise or artifact that affects the quality of visual images due to human error (e.g., due to movement of the camera by a human staff member, which would normally increase as the staff member becomes tired). Also, the mobile data capture devices can be directed in real time to areas in the target space to efficiently capture data from the target space, which minimizes the amount of target space data captured (e.g., efficient use of resources at the mobile data capture device and at a data store for storing a number of visual images taken) and the overall time needed to perform target space data capture (e.g., as compared to a human spending too much time taking a great number of visual images that are not needed, or not taking enough visual images and needing to go back to take additional visual images, which also increases the overall time). The data capture process of the automated scheme is also robust, allowing visual images or depth maps to be taken from a variety of positions and angles without requiring consistent conformity with a stationary or semi-stationary viewpoint.

The automated scheme also reduces human error in verification of the three-dimensional representation (e.g., less likely to miss errors or discrepancies between the layouts of the three-dimensional representation and the official planogram). The automated scheme also reduces the total "employee-hours" needed to perform verification of target space layout (e.g., a single human staff member may optionally supervise the automated visual image capture, which involves fewer employee-hours than compared with a team of human staff members that manually perform verification). The automated scheme can also be implemented without supervision while the target space is closed to customers (e.g., overnight). The automated scheme is suited for implementation in target spaces that change configuration and easily scales to larger target spaces.

Finally, the automated scheme produces a three-dimensional representation that provides an accurate and realistic visual representation of the target space, meaning that one no longer has to be physically present in the target space in order to observe visual details of the target space. For example, the three-dimensional representation can be viewed by a remote user via a user interface, which enables the remote user to essentially "walk through" the three-dimensional representation. The remote user can be alerted to various visual details, such as special display issues (e.g., special display is not as attractive in implementation as on paper), shelving height issues (e.g., products placed too high for target consumers), distance between products (e.g., the distance between two products bundled in a sale is too large), that the remote user could only observe if physically present in the target space.

Example Embodiments

FIG. 1 is a simplified block diagram illustrating components of an example system 100 in which the present disclosure can be implemented. System 100 includes one or more mobile data capture devices 110(1)-(N), a local network 120, a remote network 125, a local server 130 that is communicatively coupled to a local data store 135, a remote server 140 that is communicatively coupled to a remote data store 145, a local 3D (three dimensional) representation module 150 and a remote 3D representation module 155. Mobile data capture devices 110(1)-(N) are communicatively coupled to local server 130 via local network 120. Local server 130 and remote server 140 are communicatively coupled to one another via remote network 125. Each component is further discussed below.

Mobile data capture devices 110(1)-(N) are configured to move throughout a target space (such as a retail store space) with the assistance of local 3D (three-dimensional) representation module 150, capture data about the target space, and relay such target space data to local 3D representation module 150. Each mobile data capture device includes at least one camera, mechanical locomotion, and a computing device, which are further discussed below. In one embodiment, each mobile data capture device also includes a 3D sensor. In one embodiment, each mobile data capture device also includes a set of range finding sensors, which are used to avoid collisions with objects in the target space and keep the mobile data capture device within an outer boundary, as also further discussed below.

The camera of the mobile data capture device is configured to capture data, such as visual image data (e.g., digital photographs), which is temporarily stored on the mobile data capture device (e.g., stored in memory of the mobile data capture device) and transmitted to local 3D representation module 150. The camera can be mounted on a telescoping camera mount that changes the height of the camera. The camera mount can also swivel in the horizontal and vertical directions, allowing the camera's angle to vary up to a 360° range in the horizontal axis and up to a 180° range in the vertical axis. The height and angle of a camera is referred to as the camera's position. The camera position is controlled by the computing device of the mobile data capture device, according to instructions received from local 3D representation module 150. The instructions can indicate a target position of the camera, which the camera is placed into before capturing one or more visual images. In one embodiment, the camera also includes a light source (e.g., light emitting diodes (LEDs), incandescent lighting, florescent lighting, or other light sources) to reduce shadows or other visual image noise. The camera is generally configured to take high-resolution visual images, although the camera may be configured to take other visual images at other resolutions (e.g., low-resolution visual images).

In one embodiment, the mobile data capture device includes a 3D sensor that is configured to capture depth map data, where the mobile data capture device captures both a depth map (using the 3D sensor) and an associated visual image (using the camera) paired with the depth map (e.g., the depth map and visual image are taken by the mobile data capture device at a same location and position). A depth map includes information relating to the distance of surfaces of objects in the target space from the 3D sensor. In one embodiment, a depth map is a low-resolution grayscale image (e.g., a visual image in "black-and-white"), where each pixel of the depth map represents a measurement of depth in greyscale. For example, a visual image in grayscale (rather than in color) taken of a portion of the target space indicates the depth of the objects in the portion of target space. Darker pixels may indicate greater distance from the 3D sensor, while lighter pixels may indicate a shorter distance from the 3D sensor (or vice versa, where darker pixels indicate shorter distances and lighter pixels indicate greater distances). In such an embodiment, a 3D sensor is a camera configured to take low-resolution grayscale visual images, which are stored temporarily at the mobile data capture device (e.g., stored in memory of the mobile data capture device) and transmitted to local 3D representation module 150.

In another embodiment, a depth map (or disparity map) is extracted from two stereoscopic visual images, or two visual images of a same portion of the target space that are separated by a horizontal distance. In such an embodiment, the 3D sensor may have a single camera that captures a low-resolution visual image of a portion of target space at two locations, or the 3D sensor may have two cameras (in parallel) separated by a horizontal distance, where the cameras capture the two stereoscopic visual images of the same portion of target space at (essentially) the same time. A disparity map can be generated by comparing the pixel intensity of corresponding regions in the two stereoscopic visual images to determine a shift value between the regions, or a difference in the placement of objects in the two visual images. The shift value (also referred to as disparity) is inversely proportional to depth, where a larger disparity indicates a shorter distance from the 3D sensor and a smaller disparity indicates a larger distance from the 3D sensor.

Other examples of the 3D sensor include a radar sensor (radio detecting and ranging), a lidar (light detecting and ranging) sensor, and an infrared (IR) laser sensor, and the like. In some embodiments, it may be more cost-effective to collect visual images using a camera without using 3D sensors to collect depth maps (for generating a point cloud, as further discussed below).

The mechanical locomotion of the mobile data capture device can be wheeled locomotion, flight locomotion, and/or any other means of moving the mobile data capture device throughout the target space (e.g., providing full mobility). The mechanical locomotion is controlled by the computing device of the mobile data capture device, according to instructions received from local 3D representation module 150. The instructions can indicate a target location for the mobile data capture device, relative to the mobile data capture device's current location. The mobile data capture device moves or travels to the target location before capturing one or more visual images.

The computing device of the mobile data capture device is configured to communicate with local 3D representation module 150, such as to receive instructions and to transmit visual image data. The computing device also includes wireless capability to communicate with local 3D representation module 150 on local server 130 via local network 120, where local server 130 can be located locally to the target space, such as in a retail store. In one embodiment, the wireless capability can also be configured to communicate with remote 3D representation module 155 on remote server 140 via remote network 125 (not shown), where remote server 140 can be located remotely from the target space, such as in a central administrative office of a set of retail stores.

In one embodiment, one or more range finding sensors are placed on the outer edges of each mobile data capture device. A range finding sensor (e.g., an ultrasonic sensor) includes a transmitter and a receiver. The transmitter sends out a signal, which reflects off any object in the path of the signal and is received by the receiver. The proximity of the object to the mobile data capture device can be determined based on the amount of time the signal takes to leave the transmitter and reflect back to the receiver. The mobile data capture device can use such information to avoid collisions with objects or walls in the target space. The sensor information (e.g., close proximity of an object or wall) can be used to change movement of the mobile data capture device, such as by stopping the mobile data capture device and informing local 3D representation module 150 of the stop (e.g., in response to a proximity warning sent by the mobile data capture device, local 3D representation module 150 can issue new instructions indicating a different target location) or by traveling an alternate route to a target location (e.g., the mobile data capture device travels around the object to reach the target location).

In one embodiment, a "virtual" wall is used to form an outer boundary that the mobile data capture device does not travel past. The mobile data capture device's one or more range detecting sensors detect the virtual wall as an object in the mobile data capture device's path and avoids a "collision" with the virtual wall. In one embodiment, the virtual wall is formed using stand-alone transmitters that transmit a signal detected by the mobile data capture device's range detecting sensors as an object. In another embodiment, the virtual wall is formed using various portable objects placed in the target space as a boundary, such as a flexible strip of plastic or rubber that is detected by the mobile data capture device's range finding sensor. The virtual wall can be used to limit a mobile data capture device to a particular section of the target space (e.g., visual image capture limited to an updated area of the target space, rather than the entirety of the target space), or to act as a failsafe wall to prevent the mobile data capture device from leaving the target space (e.g., leaving through an exit door of the retail store space).

Local 3D representation module 150 is implemented on local server 130, where local server 130 includes one or more servers or computing devices that satisfy computational requirements for implementing local 3D representation model 150. Local 3D representation module 150 is configured to instruct one or more mobile data capture devices 110(1)-(N) to capture visual image data of the target space (e.g., instructing each mobile data capture device to take visual images at one or more target camera positions and target locations) and receive the visual image data from the mobile data capture devices 110(1)-(N). Local 3D representation module 150 stores the visual image data in local data store 135 (e.g., a database or other organized collection of data located on a storage device). Local data store 135 also stores other various data, as further discussed below in connection with FIG. 2.

Local 3D representation module 150 is configured to generate a three dimensional (3D) representation of the target space based on the visual image data. A 3D representation is a three dimensional model or representation of the target space from which the visual image data was captured, where the 3D representation indicates "real world" placement of objects in the target space, such as shelving, display cases, and products. Local 3D representation module 150 is also configured to verify the real world layout of a 3D representation against an approved layout of an official planogram. An official planogram defines an approved layout that specifies the locations of various objects in the target space (e.g., shelving, display cases, and products), where the target space should conform to the official planogram. Any discrepancies found between the layouts can be reported to an administrative entity of the target space (e.g., a store manager or other staff of the retail store) and/or to a supervising entity of the target space (e.g., a regional manager of a central administrative office of the retail store), such as by transmitting a report to remote server 140. Once alerted to the discrepancies, the target space can be modified to comply with the official planogram. Local 3D representation module 150 is also configured to provide a user interface that enables a user to view the 3D representation, allowing the user to effectively "walk" through a virtual 3D representation of the target space.

Remote 3D representation module 155 is implemented on remote server 140, where remote server 140 includes one or more servers or computing devices that satisfy computational requirements for implementing remote 3D representation model 155. Remote 3D representation module 155 is a remote implementation of the functionalities of local 3D representation module 150, where remote 3D representation module 155 can include all or fewer of the functionalities provided by local 3D representation module 150. For example, in one embodiment, remote 3D representation module 155 is configured to control the mobile data capture devices, receive visual image data, and generate a 3D representation, as well as verify the 3D representation. In another embodiment, remote 3D representation module 155 is configured to initiate visual image capture at a target space (where the visual image data is received and processed at local 3D representation module 150) and receive discrepancy reports from multiple local servers 130 (not shown) about various target spaces (e.g., a remote server 140 of a central office receiving reports from local servers 130 located at various retail stores). Remote 3D representation module 155 stores the received data (e.g., visual image data, discrepancy reports, official planograms, 3D representations, and the like) in remote data store 145 (e.g., a database or other organized collection of data located on a storage device). Remote data store 145 also stores other various data, as further discussed below in connection with FIG. 2.

Local network 120 and remote network 125 can be, for example, IP (Internet Protocol) networks that utilize Ethernet, IEEE 802.11x, or some other communications protocol. In light of the present disclosure, it will be appreciated that system 100, local network 120, and remote network 125 can include other components such as gateways, servers, routers, firewalls, and the like that are not germane to the discussion of the present disclosure and will not be discussed further herein. It will also be appreciated that other configurations are possible. For example, a single mobile data capture device 110 may be used rather than multiple mobile data capture devices, or multiple local servers 130 may be implemented at various locations and communicate with remote server 140. Also, a data store can be implemented using one or more storage devices (e.g., a single storage device or a collection of storage devices). A storage device can be implemented using network attached storage (NAS), file servers, storage filers, a storage area network (SAN), and the like.

The letter N is used to indicate a variable number of devices or components. For example, a variable number of mobile data capture devices 110(1)-(N) are implemented in system 100. Although the letter N is used in describing a variable number of instances of each of these different devices and components, a repeated use of the letter N does not necessarily indicate that each device and component has a same number of N instances implemented in the system.

Figure 2:
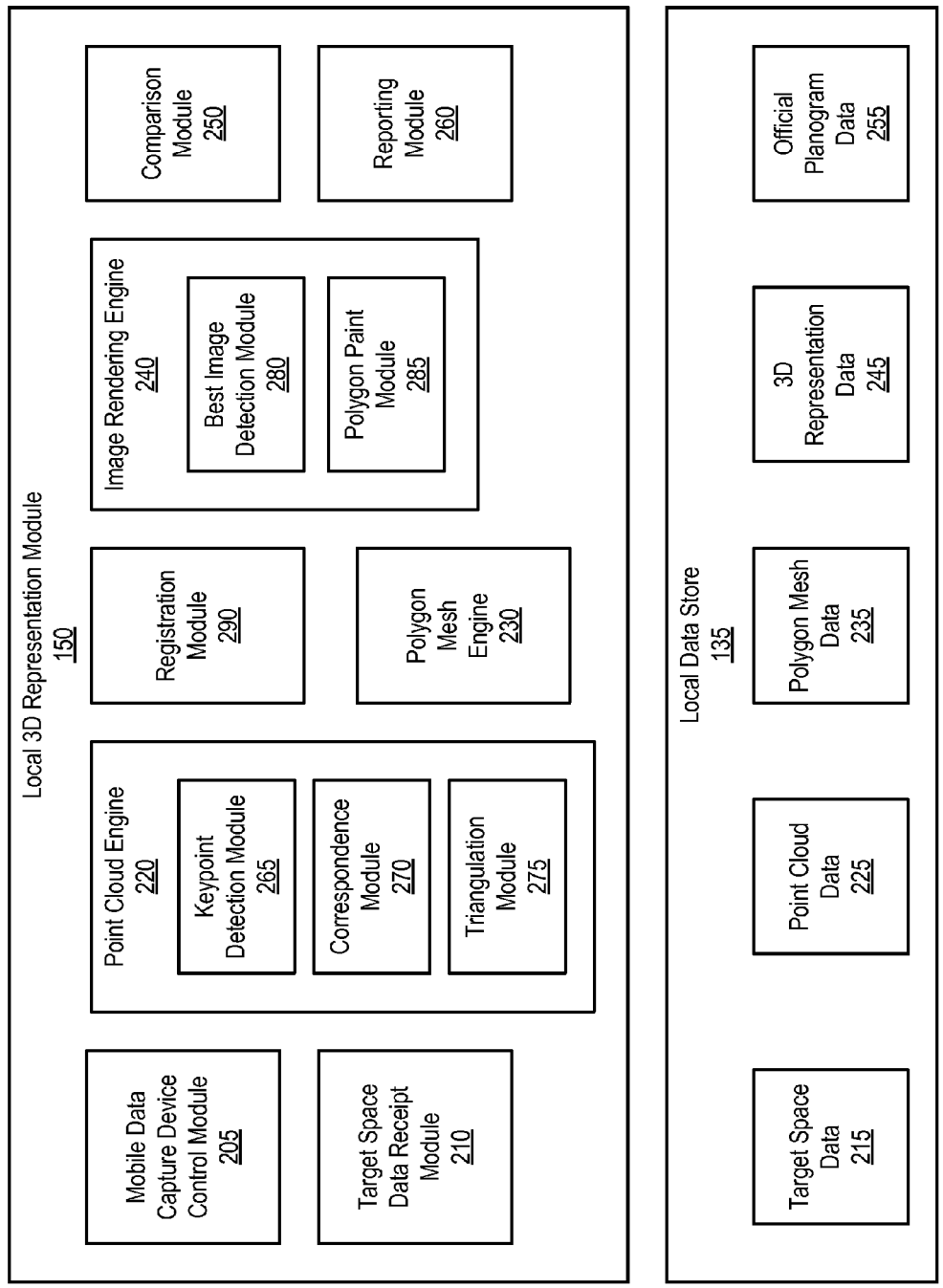
FIG. 2 is a simplified block diagram illustrating components of an example three-dimensional (3D) representation module in which the present disclosure can be implemented, according to one embodiment.

FIG. 2 is a simplified block diagram illustrating components of a local 3D representation module 150 in which the present disclosure can be implemented. Local 3D representation module 150 includes a mobile data capture device control module 205, a target space data receipt module 210, a point cloud engine 220, a registration module 290, a polygon mesh engine 230, an image rendering engine 240, a comparison module 250, and a reporting module 260. Each component is further discussed below.

Mobile data capture device control module 205 (or more simply control module 205) is configured to control the location of each mobile data capture device and the position of each mobile data capture device's camera. Control module 205 is configured to generate and transmit instructions regarding location and camera position to each mobile data capture device. The instructions are generated in response to feedback received from point cloud engine 220 indicating where data should be captured in the target space. Mobile data capture device control module 205 can also send instructions to the mobile data capture devices to perform various initialization, calibration, and shut down procedures.

In one embodiment, one or more mobile data capture devices can be initially placed at any location within the target space (e.g., one or more devices placed in (essentially) a single location or one or more devices scattered throughout the target space at multiple different locations). The initial location may be the same location (e.g., each mobile data capture device is housed at a default location in the target space) or may change (e.g., each mobile data capture device is placed in the target space at some location) each time a visual image capture process is initiated.

In one embodiment, control module 205 is configured to instruct each mobile data capture device to begin capturing target space data while remaining in its initial location, such as by spinning in place and taking a number of visual images and depth maps. This initial target space data is used to generate an initial local point cloud, or an initial point cloud that represents a portion of the target space that is located locally to the mobile data capture device that captured the target space data used to generate the 3D point cloud. The initial point cloud becomes the master point cloud (or is incorporated with an empty master point cloud), where subsequent local point clouds are incorporated into the master point cloud (as further discussed below). Control module 205 determines the mobile data capture device's location and orientation relative to the master point cloud and directs the mobile data capture device toward a next location relative to the master point cloud, which corresponds to a location in the real world relative to the target space represented by the master point cloud. The mobile data capture device captures target space data at the next position that is used to generate a subsequent local point cloud. Control module 205 continues to direct the mobile data capture device to various locations relative to the master point cloud to capture target space data, which "grows" the size of master point cloud to cover, or sufficiently represent, the target space. If two or more mobile data capture devices are used, multiple "master" point clouds may be generated and will eventually grow to overlap one another (as further discussed below). This process continues until a single master point cloud sufficient represents the target space. In one embodiment, a two-dimensional (e.g., top down) floor plan is used to direct the mobile data capture devices throughout the target space (e.g., reducing the master point cloud to a footprint or floor plan of the target space).

Figure 3A:
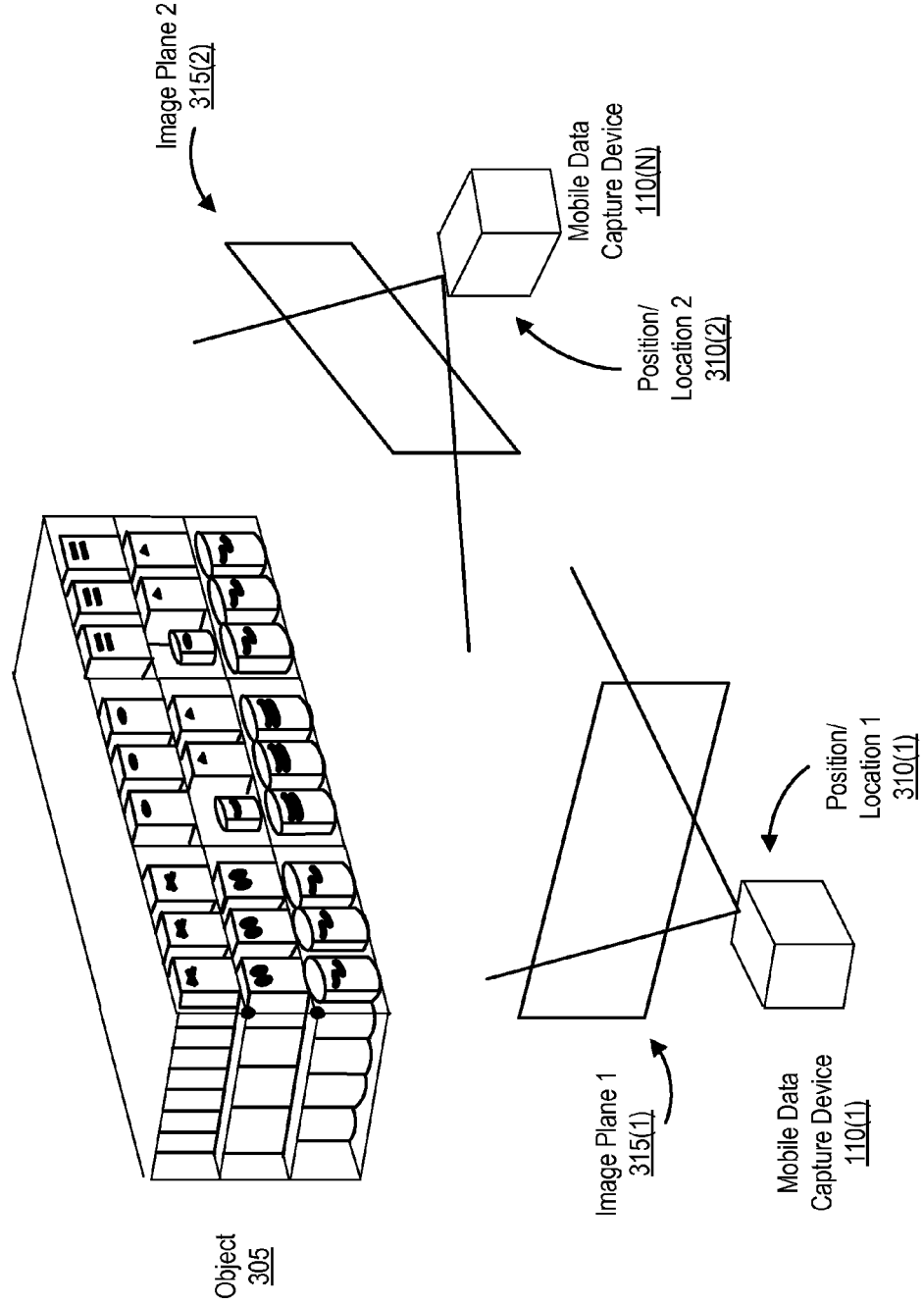

Target space data receipt module 210 is configured to receive target space data, in the form of multiple visual images (e.g., digital photographs) and/or associated multiple depth maps, from the mobile data capture devices. The multiple visual images are pictures or digital photographs taken of the target space, including the objects in the target space, from a variety of different positions and locations. Each visual image is associated with a depth map, which is also taken of the target space from the same variety of positions and locations (e.g., each depth map is taken at the same position/location that the associated or paired visual image is taken). For example, FIG. 3A illustrates an object 305 in a target space, where one or more mobile data capture devices 110(1)-(N) are configured to take a number of visual images and depth maps of object 305 in target space from different positions and locations 310.

Each visual image taken at a particular position and location is a particular view of the target space. Using a pinhole camera model, the image plane of the visual image is behind the camera's optical center (e.g., the lens) and upside down (e.g., rotated by 180°). To simplify the illustrations herein, a virtual image plane (referred to herein as simply image plane 315) is placed in front of the camera's optical center (also referred to herein as the center of projection) to produce an unrotated visual image (e.g., oriented in the same direction as the target space). It is desirable that a number of different visual images are taken from different views of a same section of the target space (e.g., different views of a same object in the same section of target space) in order to obtain three-dimensional information from the visual images, as further discussed below. Target space data receipt module 210 is also configured to store the visual image data and/or depth map data captured from the target space in local data store 135 as target space data 215.

Point cloud engine 220 is configured to generate a local 3D point cloud that represents a portion of the target space, including the objects in the portion of target space, based on the target space data received from the mobile data capture devices. In one embodiment, point cloud engine 220 is configured to generate a local 3D point cloud using the visual image data of a portion of target space captured by a given mobile data capture device. In one embodiment, point cloud engine 220 is configured to generate the local 3D point cloud using the depth map data of the portion of target space captured by a given mobile data capture device. Point cloud engine optionally stores information about the local 3D point cloud as part of point cloud data 225. Once a local 3D point cloud is generated, registration module 290 is configured to incorporate the local 3D point cloud into a master point cloud. Registration module 290 is configured to store information about the master point cloud as part of point cloud data 225, as further discussed below. Point cloud engine 220 is also configured to evaluate the master point cloud, determine whether any gaps exist in the master point cloud, and instruct the one or more mobile data capture devices to capture additional target space data to fill in the gaps, as discussed below.

An embodiment of point cloud engine 220 that uses visual image data is illustrated in FIG. 2. As illustrated, point cloud engine 220 processes the multiple visual images of the visual image data to extract three-dimensional information regarding the objects from the visual images, using geometric relations between the multiple visual images of the objects, as described below. Point cloud engine 220 may implement algorithms related to structure from motion (SfM), stereovision, and/or other state of the art techniques, which are configured to transform the visual images into a local 3D point cloud (e.g., a 3D point cloud of a portion of the target space). Point cloud engine 220 also evaluates the quality (e.g., the density of the points throughout the point cloud) of the local 3D point cloud in real time to determine whether enough visual image data has been captured by the mobile data capture devices to generate a dense point cloud (where the density of the point cloud may depend on the algorithms implemented by point cloud engine 220, polygon mesh engine 230, and/or image rendering engine 240). A sparse point cloud may have 3D points unevenly distributed in the local point cloud and may not provide enough three-dimensional information about the target space that is needed by the polygon mesh algorithm to generate a surface that accurately represents objects in the target space (as further discussed below). A dense point cloud of evenly distributed 3D points would likely provide enough three-dimensional information about the target space for an accurate surface to be generated. Point cloud engine 220 includes a keypoint detection module 265, a correspondence module 270, and a triangulation module 275.

Keypoint detection module 265 is configured to detect a number of keypoints in each of the multiple visual images using a keypoint detection algorithm. The keypoints can be used to find a set of visual images that correspond to a single section of the target space, as further discussed below. A keypoint is a point of interest in a visual image, as defined by the keypoint detection algorithm. It is desirable that keypoints have a well defined position in a visual image and are stable despite image noise or other local and global perturbations. The keypoint detection algorithm is configured to analyze each pixel of a given visual image and detect whether a keypoint exists at that pixel. Keypoint detection module 265 is configured to store information about the keypoints detected in each visual image as part of point cloud data 225. In one embodiment, point cloud data 225 includes a keypoint-to-visual-image mapping, which stores a number of associations between keypoints and the visual images in which the keypoints are detected. For example, an association between a keypoint and a visual image containing the keypoint can be stored in a entry of the keypointto-visual image mapping, such as by including an identifier of the keypoint and an identifier of the associated visual image in the entry. In one embodiment, each entry stores a single visual image identifier and one or more keypoint identifiers.

Each keypoint in a visual image is a projection of a physical "real world" feature of an object in the target space onto a visual image. Various visual images (e.g., taken at different views) of a same physical feature in the target space will each have a projection, or keypoint, that corresponds to the same physical feature (e.g., a corner, an edge, and the like). Accordingly, geometric relations between the visual images of the same physical feature can be used to correlate each keypoint to a point in three-dimensional space (or a 3D point), which represents the physical feature of the object. A number of 3D points can be generated by correlating the keypoints of the visual images and applying inverse projection (as further discussed below), which form a point cloud. While various keypoint detection algorithms can be used, it is desirable that a keypoint detection algorithm should robustly detect keypoints. In other words, the keypoint detection algorithm should reliably (e.g., repeatedly) detect keypoints in two or more different visual images of the same physical feature.

The keypoint detection algorithm can be area-based or feature-based. For example, an area-based keypoint detection algorithm may detect a keypoint in a visual image by comparing an attribute of a pixel with attributes of neighboring pixels, such as brightness magnitude values. A pixel that has a local minima value or local maxima value may be detected by the keypoint detection algorithm to be a point of interest, or a keypoint. A feature-based keypoint detection algorithm may detect a set of keypoints, also referred to as a feature of interest, in a visual image by determining a set of neighboring pixels that each have a similar attribute. For example, a set of pixels that have a strong gradient magnitude value (which indicates that the pixels are on a same edge) may be detected by the keypoint detection algorithm to be a feature of interest, or a set of keypoints. Example feature-based keypoint detection algorithms include corner detection algorithms, edge detection algorithms, blob detection algorithms, ridge detection algorithms, and the like.

In one embodiment, feature markers can be used in the target space to simplify the keypoint detection algorithm and to reduce keypoint detection time. Feature markers are applied to physical features in the target space, where the feature markers are easily identifiable by the keypoint detection algorithm, such as yellow tape. In such an embodiment, the keypoint detection algorithm can simply detect whether pixels in a visual image have an attribute (such as a color or brightness magnitude) that matches the attributes of the feature marker (e.g., the yellow color of yellow tape). In another embodiment, IR lasers project keypoints onto a target space, simplifying detection of keypoints and subsequent keypoint matching.

Correspondence module 270 is configured to compare visual images with one another to find matching sets of visual images, where each matching set includes two or more visual images that correspond to a common section of the target space (e.g., two or more visual images taken at different views of the same section of the target space), using a match detection algorithm. The match detection algorithm is configured to analyze keypoints in a portion of a visual image, such as by determining relationships among the keypoints from attributes shared by the keypoints. The match detection algorithm is also configured to search portions of other visual images to find matching keypoints, or keypoints that have sufficiently similar relationships. The matching, or correlated, keypoints are projections of a common physical feature, indicating that the visual images containing such correlated keypoints are visual images that correspond to a common section of the target space (which contains the common physical feature). The correlated keypoints can then be used to find a 3D point in space corresponding to the estimated location of the common physical feature, as further discussed below.

For example, FIG. 3B illustrates a number of physical features in the target space (which are illustrated as black dots) that are captured by one or more mobile data capture devices 110 (which are illustrated as black triangles) in three different views 320. By comparing the keypoints of the physical features in the views, views that share common physical features can be matched as a set (as illustrated in correlated view map 325) and are used together to reconstruct the physical features in a 3D space, as further discussed below. In one embodiment, correspondence module 270 is configured to store information about the matching sets of visual images as part of point cloud data 225, where a matching set identifier can be associated with an identifier of each visual image of the set.

The match detection algorithm is also area-based or feature-based and should be selected to comport with the keypoint detection algorithm. For example, an area-based match detection algorithm can determine relationships among keypoints in a given portion of one visual image, such as determining the relative positions of the keypoints to one another in the given visual image portion. The area-based match detection algorithm can use the relationships to identify keypoints in a portion of another visual image that have sufficiently similar relationships. A feature-based match detection algorithm can use the relationships of a set of keypoints (or a feature of interest), such as the set of keypoints having a common similar attribute, to identify keypoints in a portion of another visual image that have sufficiently similar relationships.

Correspondence module 270 can also implement image rectification to transform the visual images into a standard x-y coordinate system, making it easier to detect matches by searching in a single direction (e.g., searching along x axis for visual image portions that include matching keypoints) instead of searching in two directions (e.g., searching along x and y axes for visual image portions that include matching keypoints).

Figure 3C:
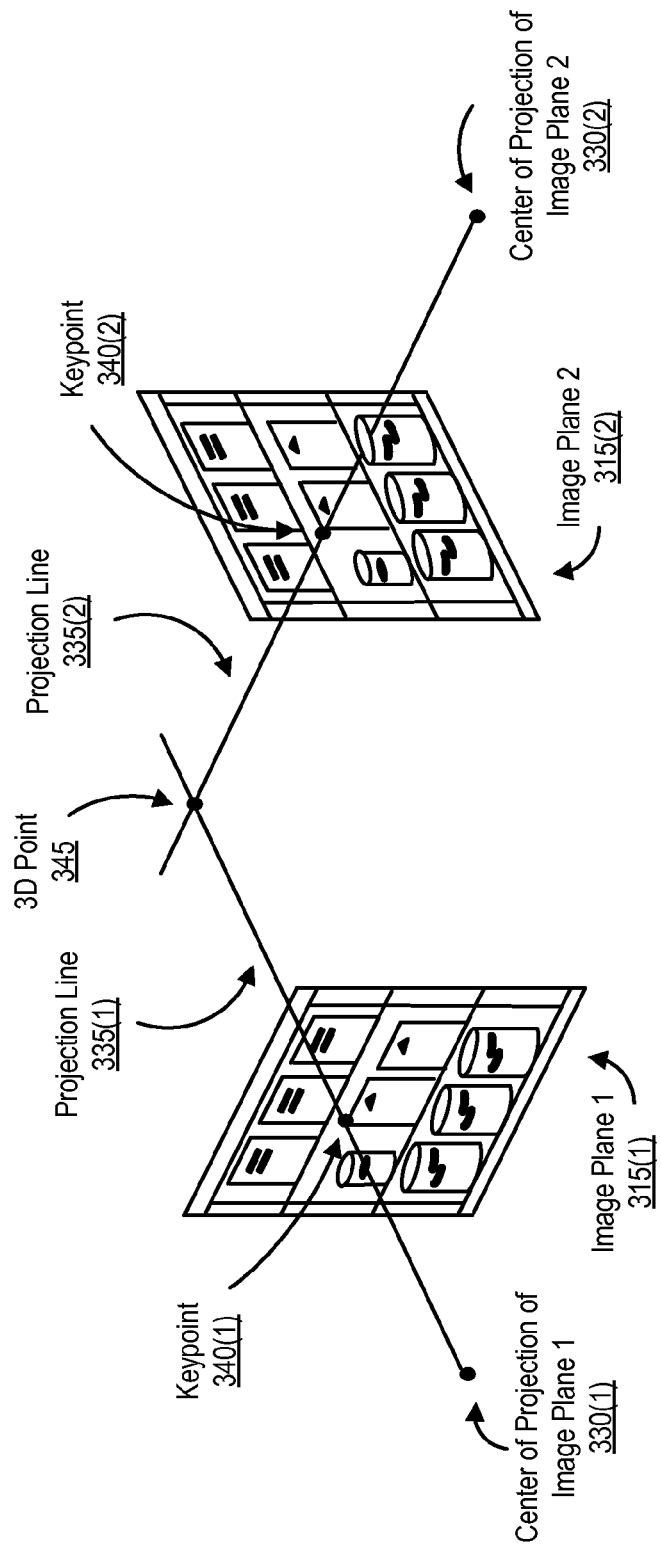

Triangulation module 275 is configured to triangulate a number of 3D points in a three-dimensional space, using epipolar geometric relations of a matching set of visual images, as well as various parameter information (e.g., camera calibration parameters, position, location, and the like, which can be estimated from differences in the relationships between keypoints in the visual images). As discussed above, since each keypoint is a projection from a common physical feature, inverse projection can be applied to the keypoints to estimate the corresponding 3D location of the common physical feature. For example, in FIG. 3C, two visual images in image planes 315(1) and 315(2) are part of a matching set of visual images, as determined by correspondence module 270. Each keypoint 340 in the visual images has a projection line or ray 335 from the center of projection 330 through the keypoint 340. The position of a corresponding 3D point 345 (e.g., an [x, y, z] coordinate of the 3D point) is estimated to be located at the intersection of two (or more) keypoint projection lines 335 in 3D space.

Triangulation module 275 is configured to store the 3D coordinates of each point in the point cloud as part of point cloud data 225. Triangulation module 275 is also configured to store information about the correlated keypoints and corresponding 3D points as part of point cloud data 225. In one embodiment, point cloud data 225 includes a 3D-point-to-keypoint mapping, which stores a number of associations between a 3D point and a number of correlated keypoints that correspond to the 3D point. For example, an association between a 3D point and a (correlated) keypoint can be stored in an entry of the 3D-point-to-keypoint mapping, such as by including an identifier of the keypoint and an identifier of the 3D point in the entry. In one embodiment, each entry stores a single 3D point identifier and one or more keypoint identifiers.

In another embodiment of point cloud engine 220 that uses depth maps (not shown), point cloud engine 220 is configured to translate the multiple depth maps into local 3D point clouds. The pixels of a depth map each indicate a measurement of depth, and can be translated into an uncalibrated local 3D point cloud, using camera calibration parameters (e.g., focal length, image center). Each pixel can be translated into a 3D point located at a position in 3D space (e.g., an [x, y, z] coordinate of the 3D point), based on the pixel's measurement of depth (e.g., the intensity magnitude of each pixel can be used to determine a proportional depth measurement that indicates a position or coordinate in three-dimensional space). In such an embodiment, keypoint detection, correspondence and triangulation need not be performed.

In such an embodiment, point cloud engine 220 is configured to store the 3D coordinates of each point in the local 3D point cloud as part of point cloud data 225. Point cloud engine 220 is also configured to store information about the 3D points and associated visual images as part of point cloud data 225. In one embodiment, point cloud data 225 includes a 3D-point-to-visual-image mapping, which stores a number of associations between 3D points of depth maps and the corresponding visual images that are paired with the depth maps. For example, an association between a 3D point of a depth map and a paired visual image (e.g., the visual image taken at the same position and location as the depth map) can be stored in an entry of the 3D-point-to-visual-image mapping, such as by including an identifier of the 3D point and an identifier of the visual image paired with the depth map used to generate the 3D point in the entry. In one embodiment, each entry stores a single 3D point identifier and one or more visual image identifiers.

In another embodiment (not shown), point cloud engine 220 is located on the mobile data capture devices (instead of being implemented as part of local 3D representation module 150 that in turn is implemented on local server 130, as illustrated in FIG. 2), where the computing devices of the mobile data capture devices satisfy computational requirements for implementing point cloud engine 220. The point cloud engine may use visual images or depth maps captured by the mobile data capture device to generate local 3D point clouds, as discussed above. In such an embodiment, the mobile data capture devices transmit the local 3D point clouds to registration module 290 for incorporation into the master point cloud. In such an embodiment, the local 3D point clouds transmitted by the mobile data capture devices are received at target space data receipt module 210 and provided to registration module 290 to be incorporated into the master point cloud. Target space data receipt module 210 optionally stores information about each local 3D point cloud as part of point cloud data 225, such as storing the 3D coordinates of each point in the local 3D point cloud as part of point cloud data 225.

Registration module 290 is configured to incorporate each local 3D point cloud into a master point cloud. Each mobile data capture device captures target space data that is used to generate a local point cloud, or point cloud that is local to the given mobile data capture device. By merging the local point clouds of each mobile data capture device, a (larger) master point cloud is generated, where the master point cloud is a potentially more accurate representation of the target space since the two or more local point clouds provide different views of the target space. Registration module 290 is configured to store the 3D coordinates of each point in the master 3D point cloud as part of point cloud data 225.

Registration module 290 identifies corresponding points between the local point cloud and the master point cloud by comparing the shape of the local point cloud with the shape of the master point cloud. For example, registration module 290 superimposes the local point cloud on the master point cloud and transforms (e.g., adjusts, translates, rotates, scales) the local point cloud to match a shape of a set of 3D points in the master point cloud. Registration module 290 finds a transformation that minimizes the distance, or alignment error, between the corresponding points. Once a best transformation is found (e.g., minimizes the alignment error to fall within a given threshold), registration module 290 applies the best transformation to the local 3D point cloud and merges the 3D points of the local 3D point cloud into the master 3D point cloud (e.g., each pair of corresponding 3D points are merged into a single 3D point in the master point cloud). In one embodiment, registration module 290 also merges the entries of the corresponding 3D points in the 3D-point-to-keypoint mapping (when using visual images) or the entries of the corresponding 3D points in the 3D-point-to-visual-image mapping (when using depth maps).

If two or more mobile data capture devices are used to capture target space data, the mobile data capture devices may be located a large distance from each other, where the local point clouds of each mobile data capture device cannot be merged into a single master point cloud. In such a scenario, the local point clouds may be merged into two or more "master" point clouds. As the mobile data capture devices travel through the target space and capture additional target space data, each of the two or more master point clouds will continue to grow until the 3D points of the two or more master point clouds overlap. At that point, registration module 290 incorporates the two master point clouds with overlapping points into a single master point cloud that represents the entire target space.

Point cloud engine 220 also evaluates the master point cloud and determines whether any gaps exist in the master point cloud, which may be located at the edge of a master point cloud or in various locations within the master point cloud. A gap in the master 3D point cloud corresponds to an area in the target space that lacks the target space data (e.g., visual image data or depth map data) needed to generate enough 3D points to sufficiently represent the target space in the master 3D point cloud (e.g., the area's equivalent location in the master 3D point cloud includes unevenly distributed 3D points or generally has an absence of 3D points). Point cloud engine 220 is configured to inform control module 205 that additional target space data is needed from a particular section of the target space. In response, control module 205 is configured to instruct one or more mobile data capture devices to travel to one or more gaps to capture target space data from various views in real time. The visual images are used by point cloud engine 220 to generate 3D points to fill in the gaps in the master 3D point cloud, as discussed above.

Polygon mesh engine 230 is configured to generate a polygon mesh using the master 3D point cloud, where the polygon mesh forms an approximate surface of the master 3D point cloud. Since the master 3D point cloud represents objects in the target space, the polygon mesh surface includes approximate surfaces of the objects represented by the 3D points. A polygon mesh is a collection of polygon-shaped faces (e.g., triangles, quadrilaterals, and the like) formed of vertices and edges, which are shared among neighboring faces. The selection of a triangular polygon-shaped face provides an efficiently-generated polygon mesh, but other polygon-shaped faces may be used, depending on the level of accuracy desired (e.g., quadrilaterals may provide better detailed modeling of the objects in the target space). Polygon mesh engine 230 implements a polygon mesh generation algorithm that generates polygon faces along the edge of the master 3D point cloud, such as by using a sampling of the 3D points of the master point cloud (e.g., points interpolated from the master 3D point cloud or a set of 3D points selected from the master 3D point cloud) as vertices, where polygon faces are formed by connecting the vertices with edges. The resulting collection of polygon faces, or polygon mesh, forms an approximate surface of the master 3D point cloud. The polygon mesh provides a 3D representation of the target space, including the surfaces of the objects in the target space. Polygon mesh engine 230 is also configured to store the polygon mesh as polygon mesh data 235 in local data store 135.

A polygon mesh is illustrated in FIG. 3D. As illustrated in FIG. 3D, a target space 375 includes a number of objects 370(1)-(N), such as shelving in a retail space. After capturing visual image data of target space 375, including the objects in the target space, a master point cloud 380 is generated from the visual image data, as discussed above. Master point cloud 380 is a representation of target space 375, including objects 370(1)-(N) in target space 375. Master point cloud 380 is used to generate a polygon mesh 385 that forms an approximate surface of point cloud 380, including objects 370(1)-(N) represented in target space 375.

It is noted that the approximate surface illustrated by polygon mesh 385 may differ from the actual surface of the object in target space. For example, shelving (such as empty shelving or shelving that displays a number of products) may be represented in a polygon mesh by a rectangular block-shaped mesh (as illustrated in FIG. 3D). As further discussed below, the visual images taken of the object can be used to "paint" the polygon mesh. When painted, the rectangular block-shaped mesh representing an object appears to be much more similar to the actual surface of the object.

In one embodiment, polygon mesh engine 230 can use pre-defined meshes as part of the overall polygon mesh, where the pre-defined meshes can be used to represent objects in a polygon mesh. The pre-defined meshes are polygon meshes that form various shapes, such as rectangular blocks, pyramids, spheres, cylinders, and the like. For example, polygon mesh engine 230 may recognize a pattern in the master point cloud that matches a particular pre-defined mesh (e.g., recognizes a pyramidal-shaped object that matches a pyramidal-shaped pre-defined mesh) and uses the matching pre-defined mesh in the overall polygon mesh (e.g., stitching or inserting the pre-defined mesh into the overall polygon mesh).

Image rendering engine 240 is configured to render the visual images taken of the target space onto the polygon mesh, thereby generating a 3D model of the target space, also referred to herein as a 3D representation. Image rendering engine 240 is configured to identify a set of visual images used to generate a section of the polygon mesh and to use those visual images to paint the polygons in the section of polygon mesh. Image rendering engine 240 includes a best image detection module 280 and a polygon paint module 285.

Best image detection module 280 is configured to identify a "best" visual image for each polygon, where the best visual image is used to paint the polygon. Best image detection module 280 is configured to select a polygon of the polygon mesh and determine a "closest" 3D point to the selected polygon. In one embodiment, the closest 3D is one of the vertices of the polygon. In another embodiment, best image detection module 280 uses the position of the polygon relative to the polygon mesh to determine an equivalent position relative to the master point cloud (e.g., the position where the polygon would be equivalently located in the master point cloud). The 3D point closest to the center of the corresponding position is determined to be the closest 3D point to the selected polygon. For example, FIG. 4 illustrates polygons 405(1) and polygons 405(2) in a section of polygon mesh 410. As illustrated, 3D point 415(1) is determined to be closest to polygon 405(1), which is also a vertex of polygon 405(1), while 3D point 415(2) is determined to be the closest 3D point to the center of polygon 405(2).

Best image detection module 280 then identifies a set of keypoints that correspond to the closest 3D point. In one embodiment, best image detection module 280 is configured to perform a lookup in 3D-point-to-keypoint mapping using an identifier of the closest 3D point, which returns one or more identifiers of corresponding keypoints. Once the corresponding keypoints are found, best image detection module 280 identifies a set of corresponding visual images that include the corresponding keypoints. In one embodiment, best image detection module 280 is configured to perform a lookup in keypoint-to-visual-image mapping using identifiers of the corresponding keypoints, which returns identifiers of a set of corresponding visual images. As illustrated in FIG. 4, 3D point 415(1) has corresponding keypoints 425(1) and 425(2) in visual images 420(1) and 420(2), respectively. 3D point 415(2) has corresponding keypoints 430(1) and 430(2) in visual images 420(1) and 420(2), respectively. The set of corresponding visual images that was used to generate the polygon is now used to paint the polygon. In other words, 3D-point-to-keypoint mapping and keypoint-to-visual-image mapping maintain a history of the relationships between the data entities (e.g., visual images, keypoints, 3D points, polygons) that are used to build the polygon mesh from various visual images, where the 3D-point-to-keypoint mapping and the keypoint-to-visual-image mapping are used to identify the set of corresponding visual images that were used to generate the 3D point closest to the selected polygon.

Best image detection module 280 compares the visual images of the set of corresponding visual images to determine a "best" visual image for the selected polygon. In one embodiment, a best visual image is a visual image that has an image plane alignment that is most parallel to the surface of the selected polygon. In other words, the best visual image's image plane and the surface of the selected polygon have a minimum intersection angle, as compared with the intersection angles of the other visual images' image planes and the surface of the selected polygon. For example, visual image 420(1) is taken of the section of target space at an angle (e.g., the image plane and the surface of the selected polygon intersect at a non-zero intersection angle), while visual image 420(2) is taken of the section of target space head on (e.g., the image plane and the surface of the selected polygon do not intersect, or are parallel with an intersection angle of 0°). In this example, visual image 420(2) is selected as the best visual image because the image plane alignment is most parallel to the surface of the polygon.

In one embodiment, the best visual image is a visual image that has an image plane alignment that is "good enough" or falls within a threshold of being parallel to the surface of the selected polygon. In other words, the intersection angle of the image plane and the surface of the selected polygon is less than a given threshold angle (e.g., less than 10°). When evaluating the set of corresponding visual images for a best visual image using an intersection angle threshold, the visual image evaluated by best image detection module 280 that first meets the intersection angle threshold is determined to be the best visual image. In one embodiment, other characteristics are also considered when determining a best visual image, such as resolution, brightness, and contrast.

Once a best visual image is selected, best image detection module 280 is also configured to translate or adjust (e.g., rotate, scale, offset, and the like) the best visual image to become (essentially) parallel to the surface of the polygon. Best image detection module 280 determines a position relative to the adjusted visual image where the polygon would be equivalently located in the adjusted visual image. For example, positions of polygons 405(1) and 405(2) relative to keypoints 425(2) and 430(2) are also illustrated in visual image 420(2).

In one embodiment, best image detection module 280 also evaluates the selected polygon's surrounding adjacent polygons to determine whether the best visual image for the selected polygon is also "good enough" for the surrounding adjacent polygons. Best image detection module 280 determines whether the best visual image has an image plane alignment that is "good enough" or falls within the intersection angle threshold when compared with the surfaces of the surrounding adjacent polygons. The best visual image for the selected polygon is also used as the best visual image for each adjacent polygon whose surface has an intersection angle with the best visual image's image plane that falls within the intersection angle threshold. In such an embodiment, best image detection module 280 optimizes the best image detection process (e.g., reduces processing time and/or computational requirements) by evaluating the best visual image for the selected polygon as a possible best visual image for the surrounding adjacent polygons, rather than evaluating the entire set of corresponding visual images to determine a best visual image for each of the adjacent polygons.

Best image detection module 280 is configured to extract a portion of the adjusted visual image that corresponds to the area occupied by the selected polygon and instruct polygon paint module 285 to paint the portion of the adjusted visual image onto the selected polygon. If the best visual image is also the best visual image for one or more adjacent polygons, best image detection module 280 also extracts one or more portions of the adjusted visual image that each correspond to the areas occupied by the one or more adjacent polygons, and instructs polygon paint module 285 to paint the one or more portions onto the one or more adjacent polygons. Polygon paint module 285 is configured to paint each polygon in the polygon mesh with a corresponding portion of a visual image, which results in an image rendered polygon mesh, or a 3D representation. The resulting image rendered section of polygon mesh 440 is illustrated in FIG. 4. Polygon paint module 285 is also configured to store information about the 3D representation in local data store 135 as 3D representation data 245.

Comparison module 250 is configured to compare the 3D representation generated by image rendering engine 240 with an official planogram to determine any discrepancies between the real world layout represented in the 3D representation and the approved layout represented in the official planogram. The official planogram is stored in local data store 135 as official planogram data 255, which can be received by local data store 135 from a remote server 140 (such as from a central administrative office). In one embodiment, an official planogram includes a number of two-dimensional visual diagrams that illustrate various aspects of the approved layout, such as a top-down or master visual diagram of the approved layout (e.g., view from above the target space looking down) and a number of two-dimensional visual diagrams that are perpendicular to the master visual diagram (e.g., views within the target space, such as a view of products on a shelving unit) and are each associated with a section of the master visual diagram. The master visual diagram can be used to illustrate approved placement of large objects, such as shelving units and display cases, while each two-dimensional visual diagram can be used to illustrate approved placement of smaller objects, such as products on shelves.

In another embodiment, an official planogram includes a three-dimensional model that illustrates various aspects of the approved layout, where the three-dimensional model incorporates the visual information often displayed in a two-dimensional official planogram. For example, the three-dimensional model can be built by orienting a number of two-dimensional visual diagrams of a two-dimensional official planogram in a three-dimensional space (e.g., by placing the two-dimensional visual diagrams side by side in locations that are equivalent to their associated locations relative to the master visual diagram). An object can be represented in the resulting three-dimensional official planogram as part of a visual diagram (e.g., a product visible in the visual diagram that illustrates an approved shelving layout) or can be represented by the placement of the two-dimensional visual diagrams on one or more sides or faces of the object (e.g., the front of a shelving unit). As such, the object may not be fully represented on all sides in the three-dimensional official planogram, depending on the level of detail provided in the official planogram.

Comparison module 250 implements an image recognition algorithm that is configured to identify various visual designs (e.g., shapes, symbols, patterns, two-dimensional matrix bar codes, bar codes, logos and the like) present in two-dimensional visual images, such as in the two-dimensional visual diagrams of a two-dimensional official planogram and in the oriented two-dimensional visual diagrams of a three-dimensional official planogram. In one embodiment, the rendered images of a section of the 3D representation can be translated into a two-dimensional visual image, similar to the approach used when painting the polygons of the 3D representation (as discussed above). Since the polygons of a section may not all be co-planar in a single plane, the rendered images of the polygons in a section of the 3D representation can be translated or adjusted (e.g., rotated, scaled, offset, and so on) into a two-dimensional visual image in a single plane (generally) parallel to the surface of the section of the 3D representation. In another embodiment, the original visual images used to generate a section of the 3D representation may be used by comparison module 250, which can be identified using the 3D-point-to-keypoint mapping and keypoint-to-visual-image mapping. However, a large number of original visual images may have been used to generate the section of the 3D representation, and performing comparison of each of the original visual images would increase the overall processing time and/or computational requirements. It is preferable to use the translated rendered image of the 3D representation, which can be translated to a (single) two-dimensional visual image.

In one embodiment, the image recognition algorithm may use keypoint detection to identify a visual design in a larger two-dimensional visual image. For example, the image recognition algorithm may determine that a particular visual design is represented by a pattern of keypoints in a visual image, and can use the pattern to identify that particular visual design in other visual images, such as in a two-dimensionally translated rendered image of a section of the 3D representation and/or in a visual diagram of the official planogram.

Before comparing the 3D representation with the official planogram, comparison module 250 is configured to align sections of a 3D representation with sections of an official planogram using map markers. Comparison module 250 is configured to detect particular visual designs in the two-dimensionally translated rendered images of the 3D representation that serve as map markers, which are symbols placed on various objects in the target space. The two-dimensional visual diagrams of the official planogram also have equivalent map markers. Comparison module 250 matches the map markers of the 3D representation to equivalent map markers detected in the official planogram (e.g., matches symbols that both identify aisle 5) and associates the matching map markers. The associated map markers are used as guideposts that map or align the sections relative to the map markers of the 3D representation with sections relative to the map markers of the official planogram. In one embodiment, a user of comparison module 250 defines the placement of map markers in both the 3D representation and the official planogram. A user interface provides a virtual view of 3D representation, and a user may define and change the placement of map markers at certain virtual points throughout the 3D representation. In another embodiment, a user maps each section of the 3D representation to each section of the official planogram for greater control.

Once the 3D representation has been aligned with the official planogram, comparison module 250 is configured to use a visual design detected in a particular location in a section of the official planogram (e.g., detected in a two-dimensional visual diagram of the section) as a reference visual design and searches for the presence of a matching visual design in an equivalent position relative to the corresponding section of the 3D representation (e.g., searches in a two-dimensionally rendered image of the section). The equivalent location is effectively a search window in the two-dimensionally rendered image of the 3D representation, allowing comparison module 250 to perform efficient searches within a section of the 3D representation rather than search the entirety of the 3D representation. The image recognition algorithm estimates whether a given reference visual design (e.g., a brand logo on a product or the face of the product) is present in the equivalent location of 3D representation, which is expressed in levels of confidence. Depending on the noise present in the two-dimensional visual images of the 3D representation and the size of the search window, the image recognition algorithm may express the reliability of the estimate as a percentage of probability. For example, the image recognition algorithm may determine a 99% probability that a matching visual design is found in the equivalent location, indicating a high confidence that the matching visual design is actually present in the equivalent location. In such a case, the 3D representation and the official planogram match.

In another example, the image recognition algorithm may determine a less than 10% probability that a matching visual design is found in the equivalent location, indicating a low confidence that the matching visual design is actually present in the equivalent location. In other words, the image recognition algorithm has determined that a matching visual design has effectively not been found. A discrepancy is detected when the confidence level of a comparison falls below a threshold, such as a 50% probability that the matching visual design is present in the equivalent location (e.g., likely that the matching visual design has not been found). In other words, a discrepancy between the 3D representation and the official planogram is detected when a portion of the 3D representation differs from an equivalent portion of the official planogram.

Example discrepancies 530(1)-(N) detected between a section of an official planogram 510 and a corresponding section of a 3D representation 520 are illustrated in FIG. 5, in the context of a retail store space. In the embodiment illustrated, comparison module 250 compares the logo of products (or other visual designs of various objects) in the official planogram to logos of products in the equivalent location of 3D representation, using search windows 525(1) and 525(2) in equivalent locations in the section of the official planogram and corresponding section of the 3D representation. Since the logos do not match in the official planogram and the 3D representation (e.g., the logo of the official planogram has a less than 10% probability of being present in the equivalent position of the 3D representation), the products in the 3D representation are determined to be misplaced and a discrepancy 530(1) is detected. Similar discrepancies are also detected throughout the 3D representation, and are provided to reporting module 260, including the level of confidence of each discrepancy.

In one embodiment, comparison module 250 is configured to perform a comparison of the entirety of the 3D representation with the entirety of the official planogram, such as by comparing each section of the official planogram with each corresponding section of the 3D representation. In one embodiment, comparison module 250 determines that some sections of the 3D representation are given higher priority than other sections (e.g., due to high customer traffic in a section or due to importance placed on the products in section) and a shortened comparison is performed on the sections that have higher priority (e.g., a "spot check" is performed on high traffic areas of the 3D representation rather than performing a full comparison of the entire 3D representation).

In one embodiment, comparison module 250 is also configured to analyze the two-dimensionally translated rendered images of the 3D representation to determine product inventory counts (e.g., maintain a tally or count of how many products of each brand are displayed in the rendered images). In another embodiment, an inventory count may be simultaneously determined during visual image capture, such as by tagging products with radio frequency identifiers (RFIDs) and having an RFID reader located on a mobile data capture device to collect inventory as the mobile data capture device travels through the target space.

Reporting module 260 is configured to report the findings of comparison module 250 to an administrative entity of the target space (e.g., a store manager or other staff of a retail store) and/or to a supervising entity of the target space (e.g., a regional manager of a central administrative office of the retail store). In one embodiment, reporting module 260 is configured to generate a report summarizing the discrepancies found and transmit the report to an administrative entity of the target space (e.g., via email to a store manager or other staff of the retail store) or to a supervising entity of the target space (e.g., via a remote server 140 at a the central administrative office). The report includes a verbal description of the discrepancies (e.g., products A, B, and C of official planogram were misplaced) and/or includes visual representations of the sections of the official planogram and the corresponding sections of the 3D representation in which the discrepancies were detected.

In one embodiment, reporting module 260 sets various alerts in the 3D representation that correspond to the discrepancies, and notifies staff to view the 3D representation. For example, a user interface of local 3D representation module 150 provides a user, such as a staff member or manager (e.g., administrative entities and/or supervising entities), with a view of 3D representation. The user interface allows the user to effectively "walk" through the 3D representation, which provides a virtual 3D representation of the target space. An alert is set in the 3D representation, such as by setting a warning light or other indicator of importance in the proximity of a discrepancy, based on the level of confidence of the discrepancy. Varying alert levels are used to make staff aware of important discrepancies that should be handled or remedied immediately. For example, a red light (e.g., an indicator of high importance) can be set next to discrepancies that have a less than 10% probability of being present in the 3D representation, while a yellow light (e.g., an indicator of medium importance) can be set next to discrepancies that have a 50% probability of being present in the 3D representation. In one embodiment, a green light (e.g., an indicator of low importance) can be set next to non-discrepancies (or comparisons having a greater than 90% probability of being present in the 3D representation), indicating compliance with the official planogram. Alert levels can also be set using other attributes associated with the discrepancy (e.g., a discrepancy regarding a particular retail brand has higher importance over a discrepancy regarding a store brand). By alerting staff to the discrepancies, changes to the target space can be made to comply with the official planogram.

In one embodiment, the entire 3D representation is transmitted to the remote server, where the administrative entity can also view the 3D representation in the user interface, allowing the administrative entity to walk through the 3D representation, which provides a virtual 3D representation of the target space (e.g., retail store). The 3D representation can be stored in remote data store 145. In another embodiment, a subset of non-compliant sections of the 3D representation (e.g., sections having discrepancies) are transmitted to the remote server. In another embodiment, compliant sections of the 3D representation (e.g., sections that do not have discrepancies) are "re-rendered" with a digital image of the compliant logo or other stock image (which replaces the rendered visual images of that section of the 3D representation), in order to reduce the amount of data transmitted to the remote server (e.g., when transmitting the entire 3D representation).

Figure 6:
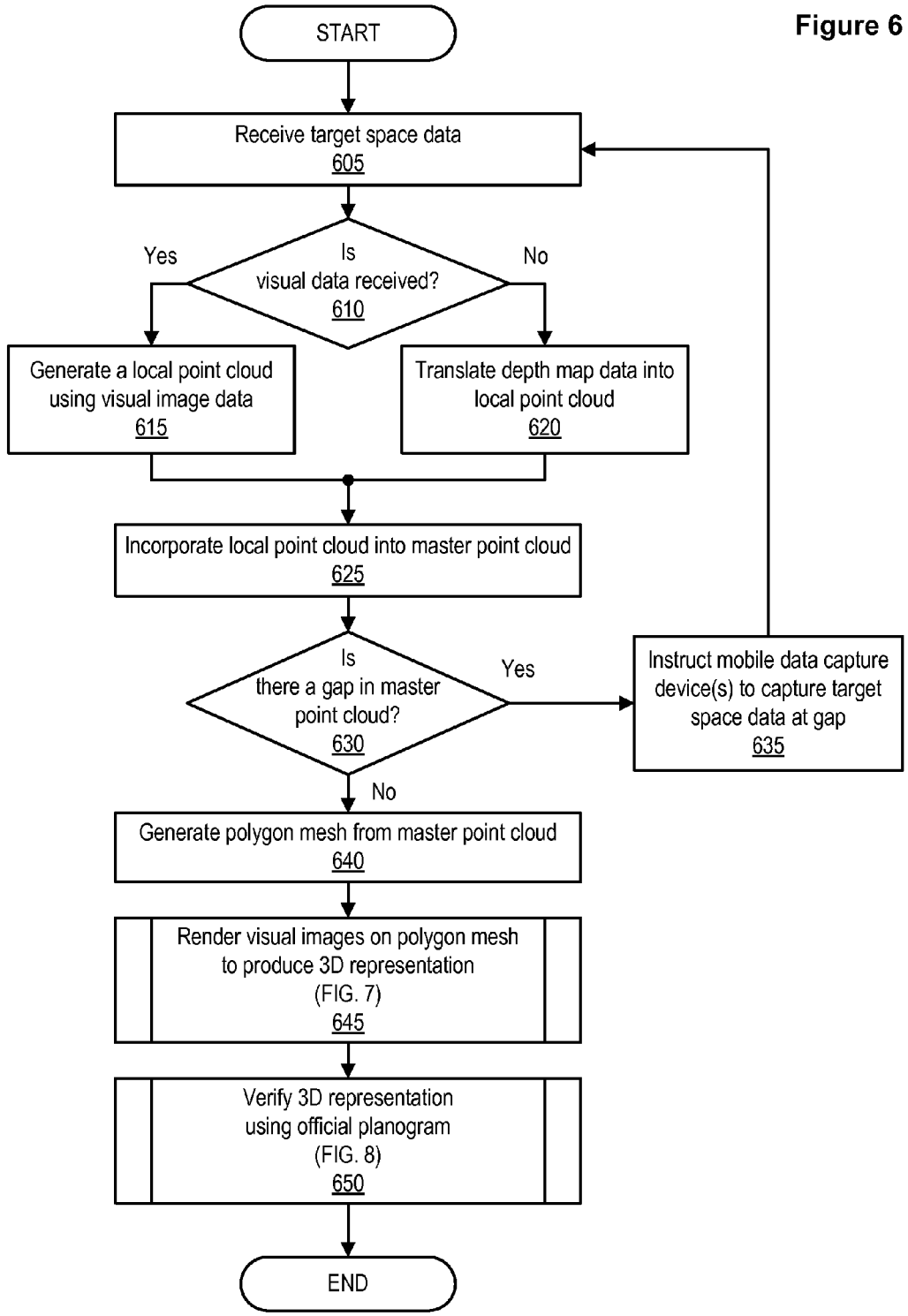
FIG. 6 is a flowchart illustrating an example 3D representation generation and verification process, according to one embodiment.

FIG. 6 is a flowchart illustrating an example 3D representation generation and verification process implemented by a local 3D representation module. Although not shown, a mobile data capture device control module of the local 3D representation module can implement an initialization process before the process illustrated in FIG. 6 is implemented, such as by instructing one or more mobile capture image devices that a visual image capture process is initiated, which may also include various initialization and calibration procedures. Once ready, the mobile capture image devices capture data from a target space and transmit the target space data to local 3D representation module. The process illustrated in FIG. 6 begins at operation 605, where a target space data receipt module of the local 3D representation module receives the target space data, such as visual image data and/or depth map data, from one or more mobile capture image devices.

The process continues to operation 610. A point cloud engine of the local 3D representation module generates a local point cloud, dependent on the implementation of target space data (e.g., whether the target space data is visual image data or depth map data). Operation 610 determines if the target space data received is visual image data or depth map data. If visual image data is received by the target space data receipt module, the process continues to operation 615, where the point cloud engine generates a local point cloud using the visual image data. In operation 615, the point cloud engine detects keypoints in the visual images, matches keypoints to identify correlated keypoints, and triangulates the position of corresponding 3D points using the correlated keypoints (as discussed above regarding keypoint detection module, correspondence module, and triangulation module, respectively). The process continues to operation 625.

Returning to operation 610, if depth map data is received by the target space data receipt module, the process continues to operation 620, where the point cloud engine translates the depth map data into a local point cloud, as discussed above. The process continues to operation 625, where the registration module incorporates the local point cloud (generated in either operation 615 or 620) into a master point cloud. As discussed above, two or more master point clouds may exist due to the distance between mobile data capture devices, where the local point cloud is incorporated into at least one master point cloud.

In an embodiment where the point cloud engine is located on the mobile data capture devices, a local point cloud can be received as target space data in operation 605. In such an embodiment, operations 610, 615, and 620 are skipped and the process continues directly to operation 625, where the local point cloud is provided to the registration module for incorporation into the master point cloud.

The process continues to operation 630, where point cloud engine determines whether there is a gap in the master point cloud. If there is a gap, the process continues to operation 635, where point cloud engine informs mobile data capture device control module of the location of the gap, relative to the master point cloud. Mobile data capture device control module instructs the one or more mobile data capture devices to capture visual image data at that gap location, relative to the target space. By doing so, point cloud engine obtains (via the mobile data capture devices) a minimal number of visual images needed to generate the master point cloud. It is noted that an ideal number of visual images needed to generate the master point cloud should balance the competing interests of computational and resource demands used to generate the master point cloud versus accuracy of the master point cloud. For example, fewer visual images might be desirable in order to reduce computational and resource demands of the local 3D representation module, but may actually result in loss of accuracy in the master point cloud, and may in fact increase computational demands in the long run due to requiring additional interpolation of 3D points from a limited number of visual images. By contrast, a larger number of visual images (or "just enough" visual image data) is desirable in order to maintain accuracy of the master point cloud while minimizing the computational and resource demands of the local 3D representation module. The process then returns to operation 605, where target space data receipt module receives additional target space data from the one or more mobile data capture devices. Thus, with each iteration of operations 605-635, a local point cloud is merged into at least one master point cloud, eventually producing a single master point cloud that represents the entire target space.

Returning to operation 630, if there is no gap (e.g., the master point cloud sufficiently represents the target space), the process continues to operation 640, where a polygon mesh engine of the local 3D representation module generates a polygon mesh from the point cloud (as discussed above). The process continues to operation 645, where an image rendering engine of the local 3D representation module renders visual images on the polygon mesh to produce a 3D representation. Operation 645 is illustrated in further detail in FIG. 7. The process continues to operation 650, where a comparison module of the local 3D representation module verifies the 3D representation using an official planogram (which also includes reporting the results of the verification by a reporting module of the local 3D representation module). Operation 650 is illustrated in further detail in FIG. 8. The process then ends.

Figure 7:
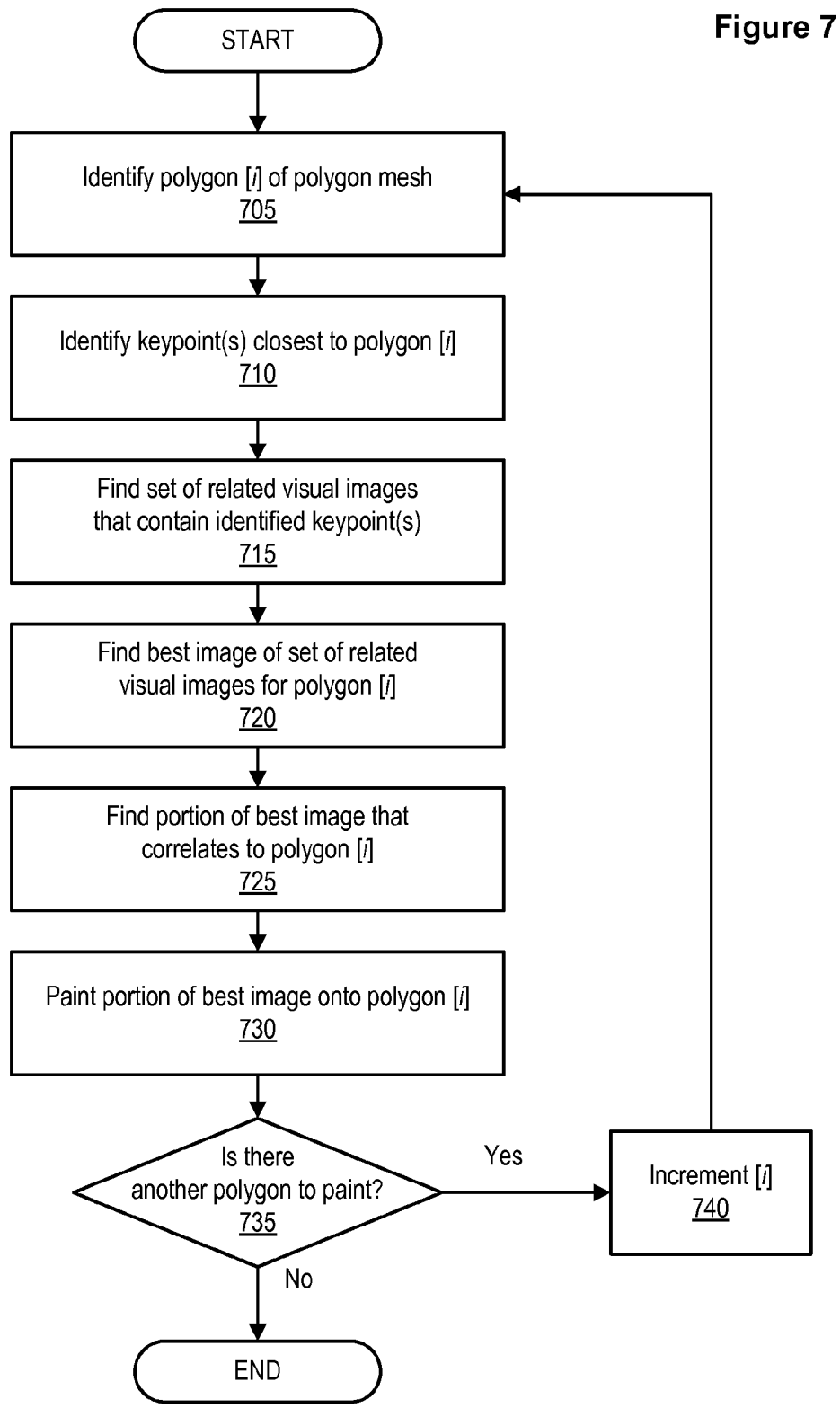
FIG. 7 is a flowchart illustrating an example image rendering process to produce a 3D representation, according to one embodiment.

FIG. 7 is a flowchart illustrating an example image rendering process to produce a 3D representation implemented by the image rendering engine. The process begins at operation 705, where a best image detection module of the image rendering engine identifies a polygon [i] (or a present polygon) of the polygon mesh. The process continues to operation 710, where the best image detection module identifies one or more keypoints closest to the polygon [i]. The process continues to operation 715, where the best image detection module finds a set of related visual images that contain the identified keypoints. The process continues to operation 720, where best image detection module finds the best image of the set of related visual images for the polygon [i]. As discussed above, the best image may include a visual image that has an image plane that is most parallel to the surface of polygon [i] or that falls within an intersection angle threshold with the surface of polygon [i]. In one embodiment, operation 720 may also include an optimization that evaluates whether the best image for polygon [i] is also the best image for one or more polygons adjacent to polygon [i], as discussed above. The process continues to operation 725, where the best image detection module finds and extracts a portion of the best image that correlates to the area occupied by polygon [i]. If the best image for polygon [i] is also the best image for one or more polygons adjacent to polygon [i], operation 730 also includes the best image detection module finding and extracting one or more portions of the best image that each correlate to the areas occupied by the one or more adjacent polygons. The process continues to operation 730, where a polygon paint module of the image rendering engine paints the portion of the best image onto the polygon [i]. If the best image for polygon [i] is also the best image for one or more polygons adjacent to polygon [i], operation 730 also includes the polygon paint module painting the one or more portions onto the one or more adjacent polygons, respectively.

The process continues to operation 735, where the best image detection module determines whether there is another polygon in the polygon mesh that needs to be painted (e.g., a best image has not yet been determined for another polygon). If so, the process continues to operation 740, where [i] is incremented and the process returns to operation 705 to begin the image rendering process for a next polygon. Returning to operation 735, if there are no other polygons left to paint (indicating that the entire polygon mesh has been rendered into the 3D representation), the process ends. The process illustrated in FIG. 7 is further discussed above, regarding the image rendering engine, the best image detection module, and the polygon paint module.

Additionally, it is noted that while operation 735 (performed by best image detection module) is illustrated as following operation 730 (performed by polygon paint module), operation 730 can occur in parallel. For example, once best image detection module provides the portion of the best image that correlates to polygon [i] to polygon paint module (e.g., in a queue), best image detection module can immediately proceed to operation 735 to determine whether a next polygon needs to be painted. If a queue is used, polygon paint module can proceed to paint each polygon according to the queue (e.g., as each polygon's portion of the best image is received).

Figure 8:
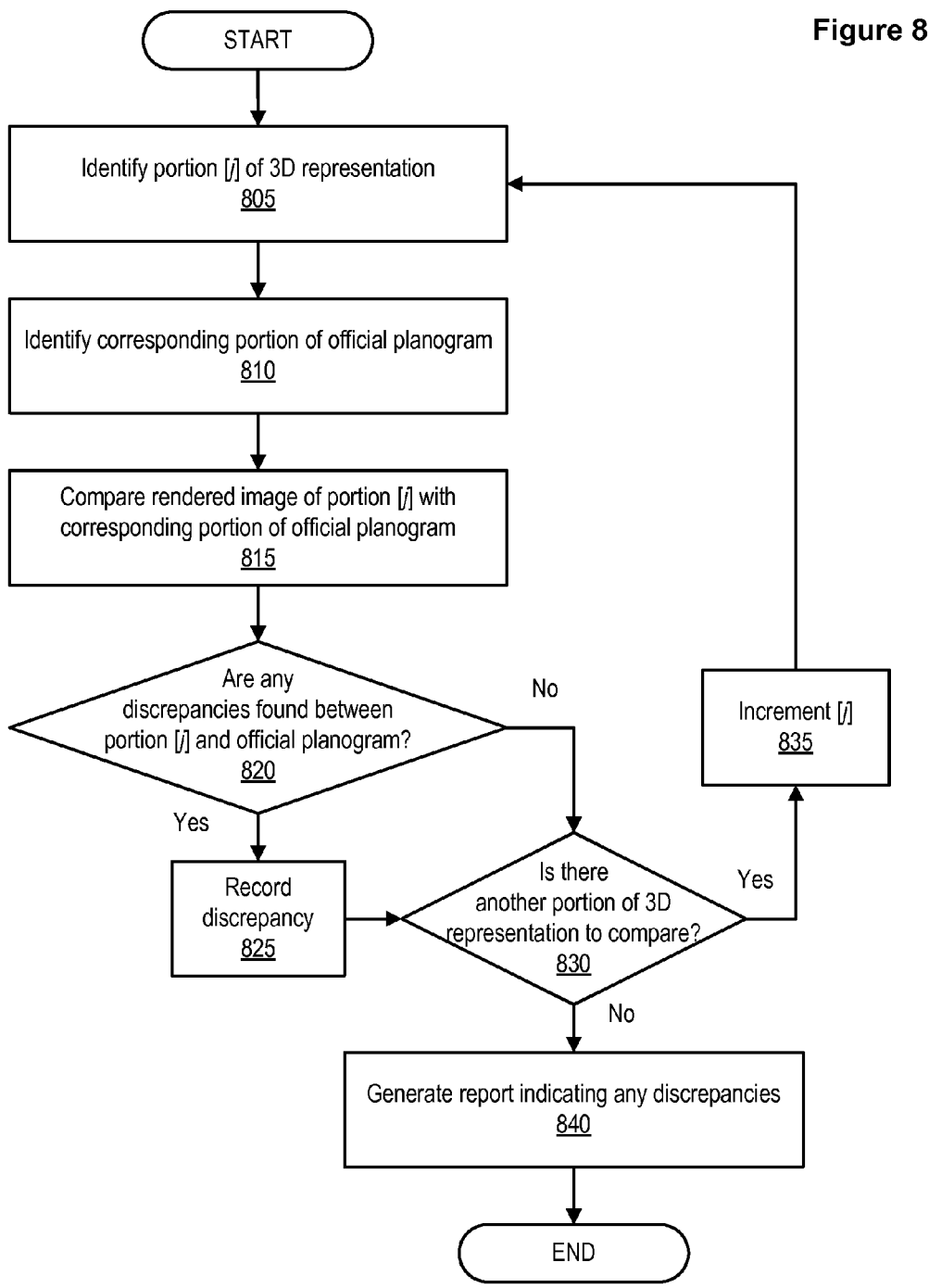
FIG. 8 is a flowchart illustrating an example planogram verification process, according to one embodiment.

FIG. 8 is a flowchart illustrating an example 3D representation verification process implemented by the comparison module and the reporting module. Although not shown, a process to map the 3D representation to an official planogram can be implemented before implementing the process illustrated in FIG. 8, as discussed above. The process illustrated in FIG. 8 begins at operation 805, where the comparison module identifies a portion [j] (or a present portion) of the 3D representation. The process continues to operation 810, where the comparison module identifies a corresponding portion of the official planogram. The process continues to operation 815, where the comparison module compares the rendered visual image of portion [j] with the corresponding portion of the official planogram in order to determine whether a reference visual design of the official planogram is present in the rendered visual image of portion [j].

The process continues to operation 820, where comparison module determines whether any discrepancies are found between portion [j] and the official planogram. If so, the process continues to operation 825, where comparison module records the one or more discrepancies. The process then continues to operation 830, as discussed below.

Returning to operation 820, if no discrepancies are found, the process continues to operation 830, where comparison module determines whether there is another portion of 3D representation to compare with the official planogram. If so, the process continues to operation 835, where [j] is incremented and the process returns to operation 805 to begin the verification process for a next portion of the 3D representation.

Returning to operation 830, if there are no other portions of 3D representation to compare (indicating that the entire 3D representation has been verified), the process continues to operation 840, where the reporting module generates a report indicating the discrepancies detected (and recorded) during the verification process. Additional details about the report are discussed above, regarding the reporting module. The process then ends. Other aspects of the verification process illustrated in FIG. 8 are further discussed above, regarding the comparison module.

An Example Computing and Network Environment

As shown above, the present invention can be implemented using a variety of computer systems and networks. An example of one such computing and network environment is described below with reference to FIGS. 9 and 10.

Figure 9:
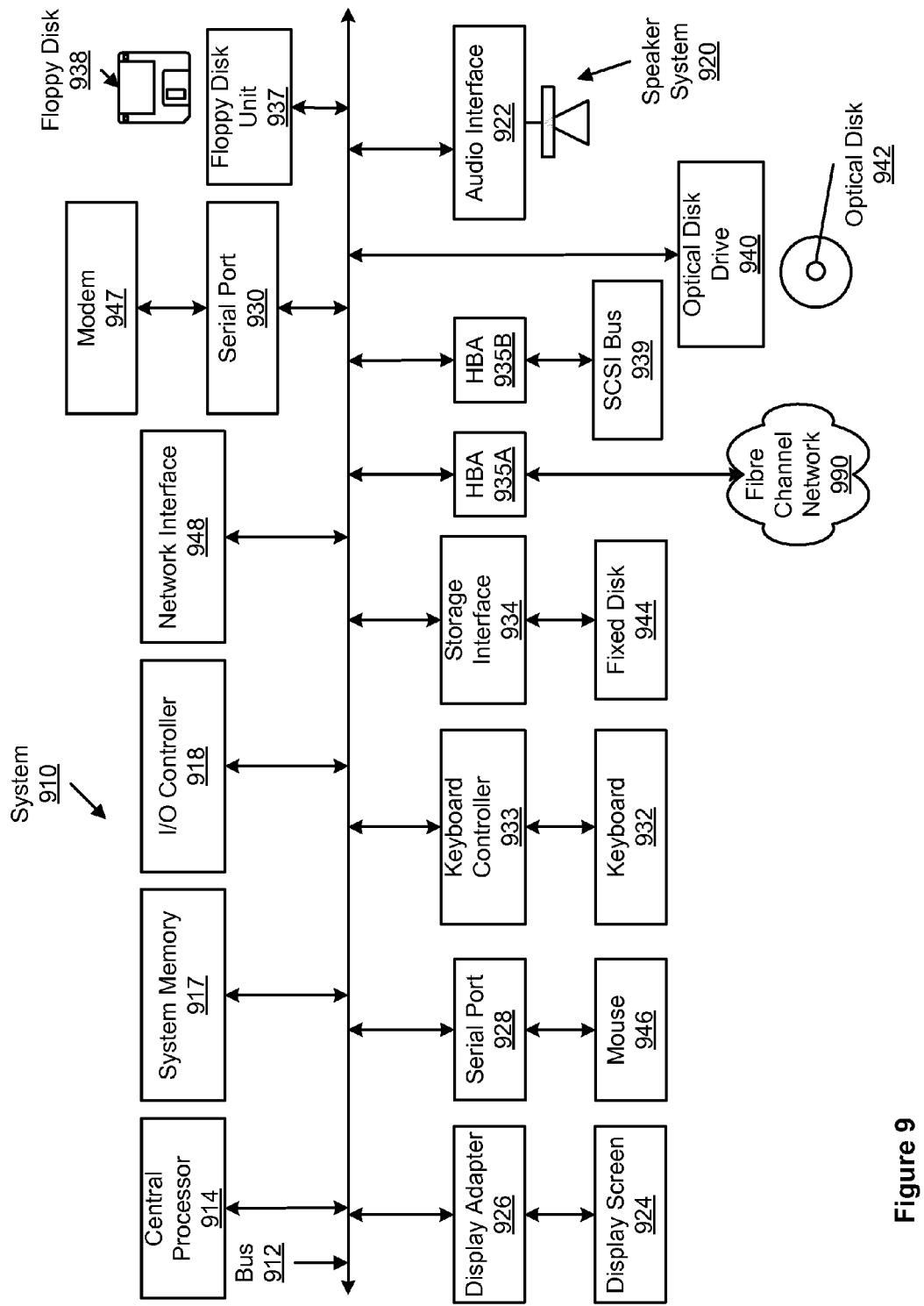
FIG. 9 is a simplified block diagram of a computer system suitable for implementing aspects of the present disclosure, according to one embodiment.

FIG. 9 depicts a block diagram of a computer system 910 suitable for implementing aspects of the present invention (e.g., for implementing computing devices for implementing various system components, such as mobile data capture device 110, local server 130, and/or remote server 140). Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer-readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer-readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present invention. The devices and subsystems can be interconnected in different ways from that shown in FIG. 9. The operation of a computer system such as that shown in FIG. 9 is readily known in the art and is not discussed in detail in this application. Code to implement the present invention can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
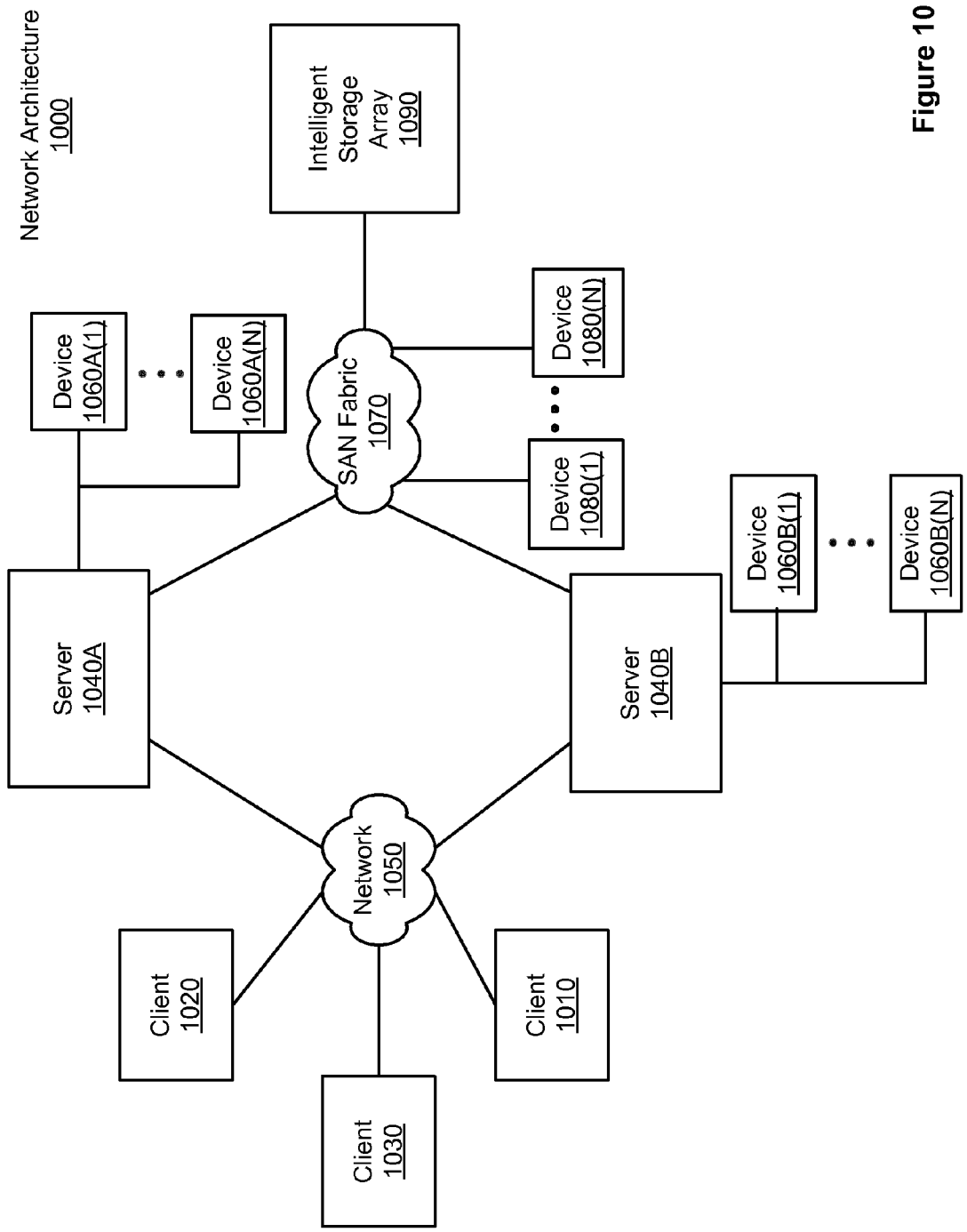
FIG. 10 is a simplified block diagram of a network architecture suitable for implementing aspects of the present disclosure, according to one embodiment.

FIG. 10 is a block diagram depicting a network architecture 1000 in which client systems 1010, 1020 and 1030, as well as storage servers 1040A and 1040B (any of which can be implemented using computer system 910), are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the invention. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 910). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 1.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method performed by a computing device, where the computing device includes at least a processor for executing instructions from a memory, the method comprising:
    controlling, by at least the processor, at least movement of one or more mobile data capture devices within a target space by wirelessly transmitting control instructions, over a wireless computer network, to the one or more mobile data capture devices;
    wirelessly receiving target space data from the one or more mobile data capture devices over the wireless computer network, wherein the target space data is captured from the target space by the one or more mobile data capture devices in response to the control instructions;
    generating a three-dimensional representation of the target space at least in part by generating a local point cloud using the target space data, and incorporating the local point cloud into a master point cloud representing the target space;
    in response to incorporating the local point cloud into the master point cloud, determining, by at least the processor, that a data gap exists in the master point cloud by evaluating data of the master point cloud, wherein the evaluating is not based on providing a visual rendering to a user;
    in response to determining that the data gap exists, controlling automatically, by at least the processor, at least movement of the one or more mobile data capture devices within the target space, to capture additional target space data to fill in the data gap in the master point cloud, by wirelessly transmitting second control instructions over the wireless computer network to the one or more mobile data capture devices; and
    automatically verifying the three-dimensional representation, wherein the automatically verifying comprises comparing a portion of the three-dimensional representation with a portion of an approved layout of the target space, and
    identifying one or more discrepancies between the portion of the three-dimensional representation and the portion of the approved layout.

2. The method of claim 1, wherein the local point cloud comprises a set of three-dimensional (3D) points, the master point cloud comprises a plurality of 3D points, and
    the incorporating comprises merging the set of 3D points into the plurality of 3D points.

3. The method of claim 2, wherein
    generating the three-dimensional representation of the target space further comprises generating a polygon mesh using the master point cloud, and
    rendering the polygon mesh, using a plurality of visual images captured from the target space, to produce the three-dimensional representation.

4. The method of claim 3, wherein the rendering the polygon mesh comprises determining a respective best image for a polygon of the polygon mesh, wherein the respective best image is determined from a subset of the plurality of visual images that are associated with the target space data used to generate the polygon, and painting a portion of the respective best image onto the polygon.

5. The method of claim 1, wherein the generating the local point cloud comprises translating depth map data into the local point cloud, wherein the target space data comprises the depth map data.

6. The method of claim 1, further comprising:

generating a report that comprises the one or more discrepancies, wherein each discrepancy indicates that a visual design present in the approved layout is not found in an equivalent location in the three-dimensional representation.

7. An apparatus comprising:

a processor;

a memory coupled to the processor and configured to store instructions executable by the processor, wherein the instructions are configured to implement:

a control module configured to control, by at least the processor, at least movement of one or more mobile data capture devices within a target space by wirelessly transmitting control instructions, over a wireless computer network, to the one or more mobile data capture devices;

a receipt module configured to wirelessly receive target space data from the one or more mobile data capture devices over the wireless computer network, wherein the target space data is captured from the target space by the one or more mobile data capture devices in response to the control instructions;

a point cloud module configured to generate a local point cloud from the target space data;

a three-dimensional representation module configured to:

incorporate the local point cloud into a master point cloud representing the target space and automatically generate a three-dimensional representation of the target space based on the master point cloud, and in response to incorporating the local point cloud into the master point cloud, determine, by at least the processor, that a data gap exists in the master point cloud by evaluating data of the master point cloud, wherein the evaluating is not based on providing a visual rendering to a user;

wherein the control module is further configured to, in response to determining that the data gap exists, automatically control, by at least the processor, at least movement of the one or more mobile data capture devices within the target space, to capture additional target space data to fill in the data gap in the master point cloud, by wirelessly transmitting second control instructions over the wireless computer network to the one or more mobile data capture devices; and a comparison module configured to automatically verify the three-dimensional representation, at least in part by:

comparing a portion of the three-dimensional representation with a portion of an approved layout of the target space, and identifying one or more discrepancies between the portion of the three-dimensional representation and the portion of the approved layout.

8. The apparatus of claim 7, further comprising a registration module configured to incorporate the local point cloud into the master point cloud, wherein the local point cloud comprises a set of three-dimensional (3D) points, the master point cloud comprises a plurality of 3D points, and the set of 3D points are merged into the plurality of 3D points.

9. The apparatus of claim 8, further comprising a polygon mesh engine configured to generate a polygon mesh using the master point cloud, and an image rendering engine configured to render the polygon mesh, using a plurality of visual images captured from the target space, to produce the three-dimensional representation, wherein the target space data comprises the plurality of visual images.

10. The apparatus of claim 9, wherein the image rendering engine comprises a best image detection module configured to determine a respective best image for a polygon of the polygon mesh, wherein the respective best image is determined from a subset of the plurality of visual images that are associated with the target space data used to generate the polygon, and a polygon paint module configured to paint a portion of the respective best image onto the polygon.

11. The apparatus of claim 7, wherein the point cloud engine is further configured to translate depth map data into the local point cloud, wherein the target space data comprises the depth map data.

12. The apparatus of claim 7, further comprising a reporting module configured to generate a report that comprises the one or more discrepancies, wherein each discrepancy indicates that a visual design present in the approved layout is not found in an equivalent location in the three-dimensional representation.

13. A non-transitory computer readable storage medium that stores program instructions that, when executed on a processor of a computing device, are configured to cause the computing device to:

control, by at least the processor, at least movement of one or more mobile data capture devices within a target space by wirelessly transmitting control instructions, over a wireless computer network, to the one or more mobile data capture devices;

wirelessly receive a plurality of visual images from the one or more mobile data capture devices over the wireless computer network, wherein the plurality of visual images is captured from the target space by the one or more mobile data capture devices in response to the control instructions;

generate a three-dimensional representation of the target space at least in part by generating a local point cloud from the plurality of visual images, and incorporating the local point cloud into a master point cloud representing the target space;

in response to incorporating the local point cloud into the master point cloud, determine, by at least the processor, that a data gap exists in the master point cloud by evaluating data of the master point cloud, wherein the evaluating is not based on providing a visual rendering to a user;

in response to determining that the data gap exits, control automatically, by at least the processor, at least movement of the one or more mobile data capture devices within the target space, to capture additional visual images to fill in the data gap in the master point cloud, by wirelessly transmitting second control instructions over the wireless computer network to the one or more mobile data capture devices; and automatically verify the three-dimensional representation, wherein the automatically verifying comprises comparing a portion of the three-dimensional representation with a portion of an approved layout of the target space, and identifying one or more discrepancies between the portion of the three-dimensional representation and the portion of the approved layout.

14. The non-transitory computer readable storage medium of claim 13, wherein the local point cloud comprises a set of three-dimensional (3D) points, the master point cloud comprises a plurality of 3D points, and the incorporating comprises merging the set of 3D points into the plurality of 3D points.

15. The non-transitory computer readable storage medium of claim 14, wherein the automatically generating the three-dimensional representation of the target space further comprises generating a polygon mesh using the master point cloud, and rendering the polygon mesh, using at least the plurality of visual images captured from the target space, to produce the three-dimensional representation.

16. The non-transitory computer readable storage medium of claim 15, wherein the rendering the polygon mesh comprises determining a respective best image for a polygon of the polygon mesh, wherein the respective best image is determined from a subset of the plurality of visual images that are associated with the target space data used to generate the polygon, and painting a portion of the respective best image onto the polygon.

17. The non-transitory computer readable storage medium of claim 13, wherein generating the three-dimensional representation of the target space further comprises translating depth map data into the local point cloud, wherein the depth map data is derived from the plurality of visual images.

18. The non-transitory computer readable storage medium of claim 13, that stores program instructions that, when executed on the processor of the computing device, are configured to cause the computing device to:

generate a report that comprises the one or more discrepancies, wherein each discrepancy indicates that a visual design present in the approved layout is not found in an equivalent location in the three-dimensional representation.

* * * * *